US011403367B2

(12) United States Patent
Martinez Cortes et al.

(10) Patent No.: US 11,403,367 B2
(45) Date of Patent: Aug. 2, 2022

(54) TECHNIQUES FOR SOLVING THE SPHERICAL POINT-IN-POLYGON PROBLEM

(71) Applicant: ORACLE INTERNATIONAL CORPORATION, Redwood Shores, CA (US)

(72) Inventors: William Martinez Cortes, Jalisco (MX); Shasank Kisan Chavan, Menlo Park, CA (US); Siva Ravada, Nashua, NH (US); Ying Hu, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 227 days.

(21) Appl. No.: 16/848,375

(22) Filed: Apr. 14, 2020

(65) Prior Publication Data

US 2021/0081490 A1 Mar. 18, 2021

Related U.S. Application Data

(60) Provisional application No. 62/899,628, filed on Sep. 12, 2019.

(51) Int. Cl.
*G06F 17/16* (2006.01)
*G06F 9/38* (2018.01)

(52) U.S. Cl.
CPC ............ *G06F 17/16* (2013.01); *G06F 9/3887* (2013.01)

(58) Field of Classification Search
CPC ......... G06F 17/16; G06F 9/3887; G06F 17/10
USPC ........................................................ 708/607
See application file for complete search history.

(56) References Cited

U.S. PATENT DOCUMENTS

| 5,255,356 | A | 10/1993 | Michelman et al. |
| 5,265,246 | A | 11/1993 | Li |
| 5,404,510 | A | 4/1995 | Smith et al. |
| 5,572,634 | A | 11/1996 | Duluk |
| 5,574,835 | A | 11/1996 | Duluk et al. |

(Continued)

FOREIGN PATENT DOCUMENTS

WO    WO 2012/032184 A1    3/2012

OTHER PUBLICATIONS

Schaffner et al., "A Hybrid Row-Column OLTP Database Architecture for Operational Reporting", dated Aug. 24, 2008, 14 pages.

(Continued)

*Primary Examiner* — Tan V Mai
(74) *Attorney, Agent, or Firm* — Hickman Becker Bingham Ledesma LLP

(57) ABSTRACT

Techniques described herein perform spherical PIP analysis by detecting whether a test ray (defined by a test point (TP) and a point (EP) that is external to a spherical polygon) crosses edge arcs ("edges") of the polygon based on relative orientations of vertices of the test ray and edges. A classifier vector (CV) for a test ray is calculated based on the cross-product of the TP and the EP. Using the CV, the orientation of each vertex of the polygon with respect to the test ray is determined. Candidate edges having vertices with opposite orientations with respect to the test ray are identified. Crossing edges are determine by calculating CVs for each candidate edge, and determining orientations of the TP and EP with respect to each candidate edge. A set of crossing edges is determined, where the TP and the EP have opposite orientations with respect to each crossing edge.

26 Claims, 12 Drawing Sheets

(56) References Cited

U.S. PATENT DOCUMENTS

| | | | |
|---|---|---|---|
| 5,794,229 | A | 8/1998 | French et al. |
| 5,943,689 | A | 8/1999 | Tamer |
| 6,061,763 | A | 5/2000 | Rubin et al. |
| 6,701,306 | B1 | 3/2004 | Kronmiller |
| 7,031,994 | B2 | 4/2006 | Lao et al. |
| 7,080,065 | B1 | 7/2006 | Kothuri |
| 7,219,108 | B2 | 5/2007 | Kothuri et al. |
| 7,272,589 | B1 | 9/2007 | Guay |
| 7,496,589 | B1 | 2/2009 | Jain et al. |
| 8,032,499 | B2 | 10/2011 | Faerber et al. |
| 8,203,972 | B2 | 6/2012 | Sauermann |
| 8,386,468 | B2 | 2/2013 | Hu |
| 8,392,382 | B2 | 3/2013 | Marwah et al. |
| 8,583,692 | B2 | 11/2013 | Ganesh |
| 8,645,337 | B2 | 2/2014 | Kapoor et al. |
| 8,832,142 | B2 | 9/2014 | Marwah et al. |
| 9,009,199 | B2 | 4/2015 | Asmundsson |
| 2002/0059287 | A1 | 5/2002 | Karasudani |
| 2003/0212694 | A1 | 11/2003 | Potapov et al. |
| 2004/0033803 | A1 | 2/2004 | Varonen et al. |
| 2004/0117396 | A1 | 6/2004 | Avadhanam et al. |
| 2005/0015216 | A1 | 1/2005 | V. Kothuri |
| 2005/0086267 | A1 | 4/2005 | Avadhanam et al. |
| 2005/0203932 | A1 | 9/2005 | Kothuri et al. |
| 2005/0210054 | A1 | 9/2005 | Harris |
| 2005/0222978 | A1 | 10/2005 | Dory et al. |
| 2007/0078914 | A1 | 4/2007 | Correl |
| 2007/0109155 | A1 | 5/2007 | Fallon |
| 2007/0143248 | A1 | 6/2007 | Uppala |
| 2008/0050025 | A1 | 2/2008 | Bashyam et al. |
| 2008/0071818 | A1 | 3/2008 | Apanowicz et al. |
| 2008/0162424 | A1 | 7/2008 | Adler |
| 2008/0162523 | A1 | 7/2008 | Kraus et al. |
| 2008/0235479 | A1 | 9/2008 | Scales |
| 2008/0281784 | A1 | 11/2008 | Zane et al. |
| 2008/0294676 | A1 | 11/2008 | Faerber et al. |
| 2008/0294863 | A1 | 11/2008 | Faerber et al. |
| 2009/0094010 | A1 | 4/2009 | Kothuri |
| 2010/0030796 | A1 | 2/2010 | Netz et al. |
| 2010/0070448 | A1 | 3/2010 | Omoigui |
| 2010/0122026 | A1 | 5/2010 | Umamageswaran |
| 2010/0161567 | A1 | 6/2010 | Makela |
| 2010/0278446 | A1 | 11/2010 | Ganesh et al. |
| 2010/0281004 | A1 | 11/2010 | Kapoor et al. |
| 2010/0281079 | A1 | 11/2010 | Marwah et al. |
| 2011/0016157 | A1 | 1/2011 | Bear et al. |
| 2011/0029569 | A1 | 2/2011 | Ganesh et al. |
| 2011/0066791 | A1 | 3/2011 | Goyal |
| 2011/0137940 | A1 | 6/2011 | Gradin et al. |
| 2011/0191522 | A1 | 8/2011 | Condict |
| 2012/0054195 | A1 | 3/2012 | Hu et al. |
| 2012/0117038 | A1 | 5/2012 | Ganesh et al. |
| 2012/0143833 | A1 | 6/2012 | Ganesh et al. |
| 2012/0158736 | A1 | 6/2012 | Milby |
| 2012/0166423 | A1 | 6/2012 | Milby |
| 2012/0166446 | A1 | 6/2012 | Bowman et al. |
| 2012/0173515 | A1 | 7/2012 | Jeong |
| 2012/0173774 | A1 | 7/2012 | Lee |
| 2012/0296883 | A1 | 11/2012 | Ganesh |
| 2013/0036101 | A1 | 2/2013 | Marwah |
| 2014/0244635 | A1 | 8/2014 | Hu et al. |
| 2014/0281247 | A1 | 9/2014 | Loaiza et al. |
| 2015/0089138 | A1 | 3/2015 | Tao et al. |
| 2015/0149479 | A1 | 5/2015 | Geringer et al. |
| 2015/0317358 | A1 | 11/2015 | Hu et al. |

OTHER PUBLICATIONS

Ailamaki, Anastassia, et al, "Weaving Relations for Cache Performance," Proceedings of the 27th International Conference on Very Large Data Bases, Rome, Italy, Sep. 11-14, 2001, 14 pages.

Dimitris Papadias et al., "Topological Relations in the World of Minimum Bounding Rectangles: A Study with R-trees", SIGMOD Conference 1995, 12 pgs.

Dittrich et al., "Towards a One Size Fits All Database Architecture" Proceedings of the 5th Biennial Conference on Innovative Data Systems Research, dated Jan. 6, 2011, 4 pages.

Edward P. F. Chan et al., "A General and Efficient Implementation of Geometric Operators and Predicates", SSD 1997, 27 pgs.

Elmasri, et al., "Fundatmentals of Database Systems," Third Edition, Addison-Wesley Longman, 2000, pp. 32, 70, 118, 131-132, 134, 155-159, 170, 252-254, 558, 569-573, 591-592, and 789-790 (26 pgs).

Macnicol, Roger et. al., Sybase IQ Multiplex—Designed for Analytics,Proceeding VLDB 2004, vol. 30, 2004, VLDB Endowment, ISBN:0-12-088469-0, 4 pages.

Abadi, Daniel J. et. al., Column-Stores vs. Row-Stores: How Different Are They Really?, ACM 2008, SIGMOD, Jun. 9 Jun. 12, 2008, 14 pages.

Rabb, David,How to Judge a Columnar Database, Information Management, website http://license.icopyright.net/user/viewFreeUse.act?fuid=MTMxMDAzMjU%3D, dated Dec. 14, 2007, 2 pages.

Ying Hu et al., "Topological Relationship Query Processing for Complex Regions in Oracle Spatial (Industrial Paper)", ACM SIGSPATIAL GIS 2012, 10 pgs.

Sybase IQ, Administration Guide, Document ID: 35375-01-1121-02, dated Sep. 19, 1997, 426 pages.

Sybase IQ, An Advanced Columnar Data Warehouse Architecture, Winter Corporation, 17 pages, Dated Jun. 2010.

Sybase IQ, Gaining the Performance Edge Using a Column-Oriented Database Management System, 12 pages, dated Mar. 2009.

Thomas Brinkhoff et al., "Multi-Step Processing of Spatial Joins", SIGMOD Conference 1994, 12 pgs.

W3Schools "SQL Update Statement", Wayback Machine darted Apr. 19, 2012, on the internet www.w3schools.com/sql/sql_update.asp>, 1 page.

Winter Corporation, Demonstrating Efficiency in Large-Scale Data Warehousing, A review of new TPC-H results for the Sun-Sybase IQ Platform, 20 pages, dated in 2003.

Ying Hu et al., "Geodetic Point-In-Polygon Query Processing in Oracle Spatial", SSTD 2011, 37 pgs.

Microsoft, "Database Instant File Initialization", SQL Server 2016, https://msdn.microsoft.com/en-us/library/ms175935.aspx, 3 pages.

U.S. Appl. No. 13/780,990, filed Feb. 28, 2013, Notice of Allowance, dated Apr. 2, 2015.

Loaiza, U.S. Appl. No. 13/840,811, filed Mar. 15, 2013, Interview Summary, dated Mar. 30, 2017.

Loaiza, U.S. Appl. No. 13/840,811, filed Mar. 15, 2013, Interview Summary, dated Apr. 10, 2018.

Loaiza, U.S. Appl. No. 13/840,811, filed Mar. 15, 2013, Interview Summary, dated Oct. 18, 2017.

Loaiza, U.S. Appl. No. 13/840,811, filed Mar. 15, 2013, Notice of Allowance, dated Jan. 9, 2019.

Loaiza, U.S. Appl. No. 13/840,811, filed Mar. 15, 2013, Notice of Allowance, dated Jun. 7, 2018.

Loaiza, U.S. Appl. No. 13/840,811, filed Mar. 15, 2013, Office Action, dated Jan. 10, 2018.

Loaiza, U.S. Appl. No. 13/840,811, filed Mar. 15, 2013, Office Action, dated Dec. 15, 2016.

U.S. Appl. No. 12/871,824, filed Aug. 30, 2010, Final Office Action, dated Jan. 4, 2013.

U.S. Appl. No. 12/871,824, filed Aug. 30, 2010, Notice of Allowance, dated Apr. 30, 2014.

Loaiza, U.S. Appl. No. 13/840,811, filed Mar. 15, 2013, Final Office Action, dated Jul. 5, 2017.

U.S. Appl. No. 12/871,824, filed Aug. 30, 2010, Notice of Allowance, dated Jan. 23, 2014.

U.S. Appl. No. 14/754,210, filed Jun. 29, 2015, Office Action, dated Apr. 11, 2016.

U.S. Appl. No. 13/780,990, filed Feb. 28, 2013, Office Action, dated Dec. 15, 2014.

U.S. Appl. No. 13/840,811, filed Mar. 15, 2013, Final Office Action, dated Jul. 15, 2015.

U.S. Appl. No. 13/840,811, filed Mar. 15, 2013, Final Office Action, dated Dec. 21, 2015.

U.S. Appl. No. 13/840,811, filed Mar. 15, 2013, Interview Summary, dated Apr. 5, 2016.

(56) References Cited

OTHER PUBLICATIONS

U.S. Appl. No. 13/840,811, filed Mar. 15, 2013, Interview Summary, dated Apr. 27, 2015.
U.S. Appl. No. 13/840,811, filed Mar. 15, 2013, Office Action, dated Jan. 12, 2015.
U.S. Appl. No. 14/092,503, filed Nov. 27, 2013, Final Office Action, dated Jan. 14, 2016.
U.S. Appl. No. 14/092,503, filed Nov. 27, 2013, Notice of Allowance, dated Jul. 13, 2016.
U.S. Appl. No. 14/092,503, filed Nov. 27, 2013, Office Action, dated Aug. 4, 2015.
U.S. Appl. No. 14/754,210, filed Jun. 29, 2015, Notice of Allowance, dated Aug. 5, 2016.
U.S. Appl. No. 12/871,824, filed Aug. 30, 2010, Office Action, dated Jun. 26, 2012.
Murray, Chuck, et al., "Oracle Spatial and Graph Developer's Guide", 12c release 12.2, E85869-01, Jun. 2017, 1016 pgs.

$$A \circ B = A_X * B_X + A_Y * B_Y + A_Z * B_Z$$

$$A \circ B = |A| * |B| * \cos(\theta)$$

FIG. 9
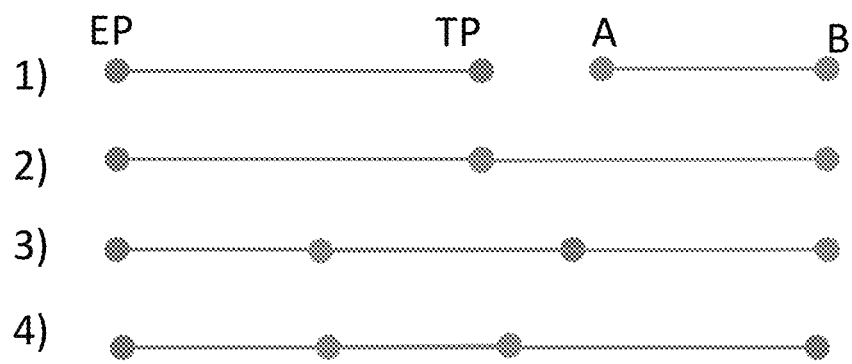
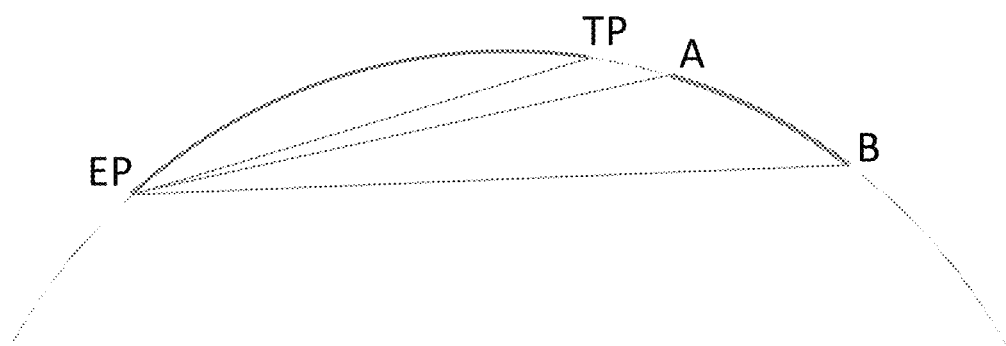

TECHNIQUES FOR SOLVING THE SPHERICAL POINT-IN-POLYGON PROBLEM

CROSS-REFERENCE TO RELATED APPLICATIONS; BENEFIT CLAIM

This application claims the benefit of Provisional Appln. 62/899,628, filed Sep. 12, 2019, titled "Technique for Solving the Spherical Point-In-Polygon Problem in Columnar Spatial Data", the entire contents of which is hereby incorporated by reference as if fully set forth herein, under 35 U.S.C. § 119(e).

Furthermore, this application is related to the following, the entire contents of each of which are hereby incorporated by reference as if fully set forth herein:

- U.S. Pat. No. 8,386,468, titled "Spatial Query Processing with Query Window Index", filed Aug. 26, 2010, and issued Feb. 26, 2013;
- U.S. application Ser. No. 14/754,210, titled "Methods For Query Processing Of Topological Relationships Among Complex Spatial Objects", and filed Jun. 29, 2015;
- U.S. application Ser. No. 14/092,503, titled "LIDAR Model With Hybrid-Columnar Format And No Indexes For Spatial Searches", and filed Nov. 27, 2013;
- U.S. application Ser. No. 13/780,990, titled "Method For Query Processing Of Topological Relationships Among Complex Spatial Objects" and filed Feb. 28, 2013;
- U.S. application Ser. No. 13/840,811, titled "Method To Accelerate Queries Using Dynamically Generated Alternate Data Formats In Flash Cache", and filed Mar. 15, 2013; and
- U.S. application Ser. No. 12/871,824, titled "Query And Exadata Support For Hybrid Columnar Compressed Data", and filed Aug. 30, 2010.

FIELD OF THE INVENTION

The present invention relates to geodetic/spherical point-in-polygon problems, and, more specifically, to efficiently determining whether a test point on a sphere is within the bounds of a spherical polygon on the same sphere.

BACKGROUND

The two-dimensional (2D) point-in-polygon (PIP) problem seeks to determine whether a test point on a plane is within the bounds of a 2D polygon that is assumed to be on the same plane. The spherical PIP problem seeks to determine whether a test point on the surface of a sphere is within the bounds of a spherical polygon, all vertices of which are assumed to be on the surface of the sphere. A spherical polygon is defined by edges that are arcs of intersecting "great circles" (or "great circle arcs") of a given sphere. (For additional background, see "Locating a Point on a Spherical Surface Relative to a Spherical Polygon of Arbitrary Shape" by Michael Bevis, and Jean-Luc Chatelain, Mathematical Geology, Vol. 21, No. 8, 1989, the entire contents of which are hereby incorporated by reference as if fully set forth herein.)

PIP problems arise in many contexts, including for geographical tools and mapping tools. Solutions to PIP problems are generally part of the building blocks of these tools. Thus, efficient PIP solutions can greatly increase the overall efficiency of the tools that use them.

Many techniques have been developed to solve the 2D PIP problem. For example, a "ray crossing" technique determines how many times a test ray, starting from a test point and going in any fixed direction, intersects the edges of a polygon by computing the intersection point(s) between the test ray and the polygon edges. If the ray from the test point intersects the edges of the polygon an odd number of times, the test point must be within the bounds of the polygon; on the other hand, if the ray from the test point intersects the edges of the polygon zero or an even number of times, the test point must be outside the bounds of the polygon.

Spherical PIP problems may be solved using 2D PIP solutions. For example, the topography of a spherical polygon and the location of a test point on the sphere may be mapped to two dimensions, and the "ray crossing" algorithm may be applied to the now two-dimensional problem. However, at times, spherical PIP problems cannot be managed by 2D algorithms with sufficient accuracy for the application.

The "ray crossing" algorithm may be further adapted to a spherical PIP problem, such that the "test ray" is a test arc between the test point and a point on the sphere that is known to be external to the spherical polygon. However, computing the intersection point between two arcs is more expensive than calculating the intersection point between 2D line segments. Specifically, calculating the intersection point between 2D line segments comprises solving a relatively simple algebraic equation comprising the definitions of the two line segments, which requires up to two addition/subtraction operations, six multiplication operations and two division operations. On the other hand, computing the intersection point between two geodetic/spherical arcs comprises the costly calculation of cross-products of the two arcs, then again calculating the cross-product of the two resulting cross-products. Thus, adaptation of the "ray crossing" algorithm for spherical PIP can be very costly.

Another approach to solving the spherical PIP problem involves precomputing a data structure, such as an in-memory R-Tree index, to encode data of a given spherical polygon. Then, instead of using cross-products to calculate intersection points between a test arc and the edge arcs of the spherical polygon, this pre-computed data structure is used to perform relatively efficient calculation of intersection points between the arcs. Nevertheless, the initial data structure computation is generally very expensive. As such, this technique is not feasible in cases where the polygon vertices (also referred to herein as polygon "points") change frequently.

It would be beneficial to efficiently compute precise solutions to spherical PIP problems without requiring expensive pre-computation of data structures, such as R-Trees.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 9 depicts several cases of coplanarity, and also depicts comparing distances between vertices of coplanar arcs.

DETAILED DESCRIPTION

Figure 1:
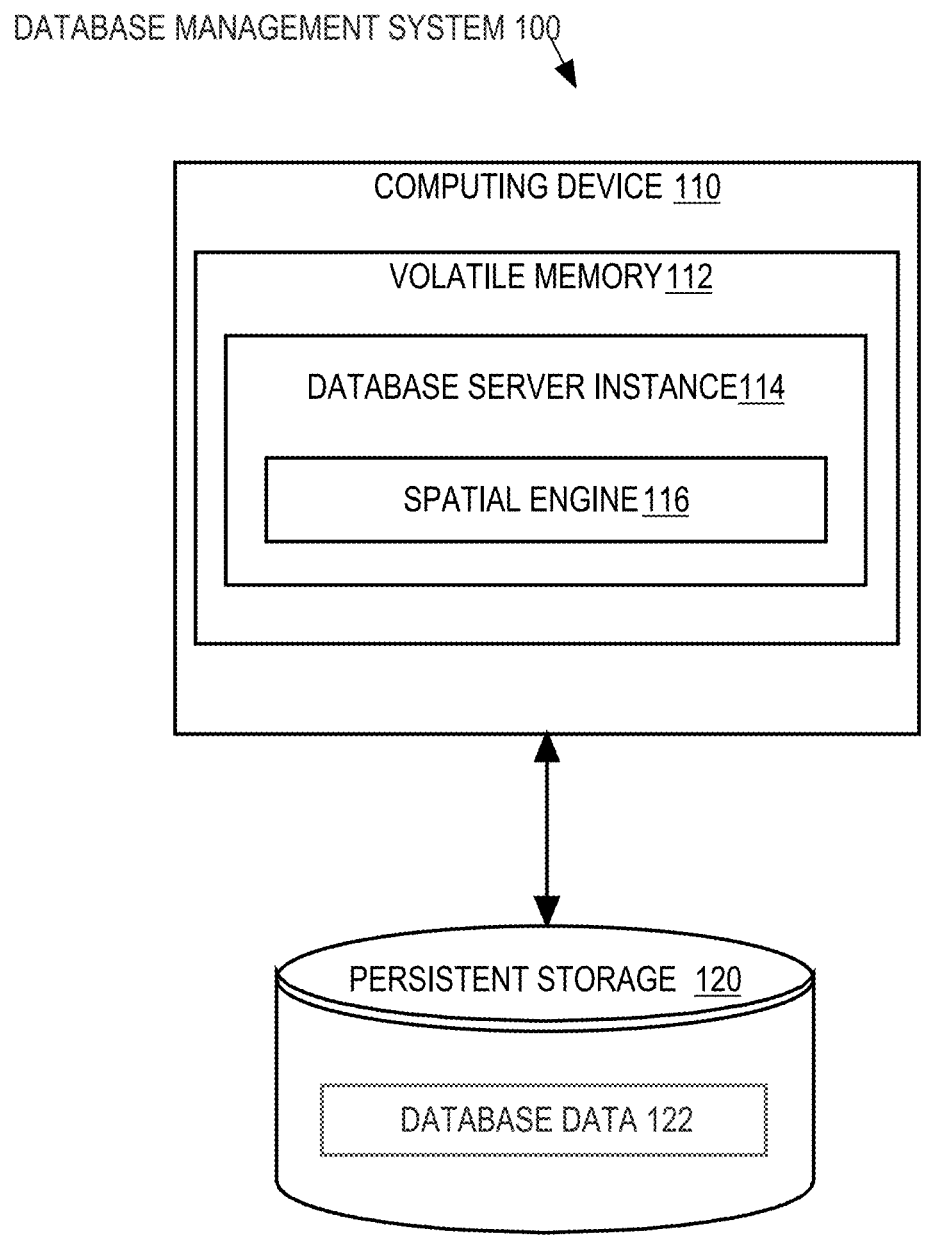
FIG. 1 is a block diagram that depicts an example arrangement for a database management system.

In the following description, for the purposes of explanation, numerous specific details are set forth in order to provide a thorough understanding of the present disclosure. It will be apparent, however, that embodiments described in the present disclosure may be practiced without these specific details. In other instances, well-known structures and devices are shown in block diagram form in order to avoid unnecessarily obscuring the present disclosure.

General Overview

Embodiments adapt the "ray crossing" technique to the spherical case without requiring computation of intersection points between arcs. Specifically, techniques described herein detect whether arcs cross without computing the exact intersection points, which is less costly than computing the intersection points of arcs. More specifically, techniques determine whether two arcs cross by determining the orientations of the vertices of each arc with respect to the other arc.

According to an embodiment, for a given spherical PIP problem involving a given test point and a given spherical polygon that are assumed to be on the surface of a given sphere (referred to herein as the "earth"), a test ray is identified based on the test point and a point that is known to be external to the spherical polygon. The test ray is one of: a test arc defined by the test point and an external point on the surface of the earth, or a test vector defined by the test point and an external point that may or may not be on the surface of the earth. Because techniques described herein determine whether an edge arc of the spherical polygon crosses the test ray based on the orientation of the test ray, the test ray need not be a great circle arc of the earth.

A classifier vector for the test ray is calculated based on the cross-product of the test point and the external point. Then, using dot product operations based on the test ray classifier vector, each vertex of the spherical polygon is evaluated to determine its orientation with respect to the test ray. For example, each vertex of the spherical polygon is classified as being oriented to the "left" or "right" of the test ray, where a left-oriented vertex is within one hemisphere of the earth defined by a great circle aligned with the test ray, and a right-oriented vertex is within the other hemisphere.

The determined orientations of the vertices of the spherical polygon are used to identify a set of candidate edge arcs that could potentially cross the test ray. Specifically, using inexpensive operations, candidate edge arcs are identified based on the candidate edge arcs having vertices with opposite orientations with respect to the test ray. To determine whether the candidate edge arcs actually cross the test ray, cross-product classifier vectors are calculated for each candidate edge arc and the orientations of the test point and external point are determined with respect to each candidate edge arc using dot product operations. A set of crossing edge arcs is determined, where the test point and the external point have opposite orientations with respect to each crossing edge arc of the set.

Thus, as described, non-candidate edge arcs are culled before calculating classifier vectors for the candidate edge arcs. As such, only the edge arcs that could potentially cross the test ray are checked for actual crossing with the test ray, which increases the efficiency of techniques described herein. Furthermore, when possible, classifier vectors are reused to reduce computation costs.

Embodiments also allow detection of coplanarity between spherical polygon edges and the test ray with minimal additional effort. Specifically, using the results of the dot product operations, each vertex of the spherical polygon is classified as being either "near" or "far" with respect to the test ray. When both vertices of a given edge arc are "near" the test ray, the edge arc is considered to be coplanar with the test ray. The coplanar cases are then classified and efficiently managed without requiring trigonometrical or square root operations.

SIMD instructions may be used to increase the efficiency of techniques described herein. For example, vertex or point information may be stored in a database in columnar format, and SIMD computer instructions may be used to perform operations (such as dot product operations) on multiple vertices or points in parallel. Also, according to an embodiment, SIMD is used to accelerate complex operations involving only two points. For example, computing a cross product requires 6 multiplication and 3 subtractions, and at least some of these operations are done in parallel by using SIMD.

By using techniques described herein, unindexed spherical PIP queries were accelerated by a factor of up to 20 times when compared to an algorithm based on computation of intersection points. The increased efficiency of solving spherical PIP problems using techniques described herein allows a greater variety of applications (including performance-sensitive applications) to store three-dimensional data and perform PIP analysis on the three-dimensional data, which is more precise than projecting three-dimensional data into two dimensions and performing 2D PIP analysis.

Database System Overview

Embodiments herein are described in the context of an example database system 100 of FIG. 1. Example database system 100 comprises a database server instance 114, which includes a spatial engine 116, running in volatile memory 112 of a computing device 110. Instance 114 maintains database data 122 in persistent storage 120. Spatial engine 116 is an example application that solves spherical PIP problems, which, notwithstanding the depiction of spatial engine 116 as part of instance 114 in FIG. 1, may be implemented as a separate application from the database server instance. Examples of Spatial database implementations can be found in the Oracle Spatial Developers User Guide (https://docs.oracle.com/en/database/oracle/oracle-database/20/spatl/index. html), by Chuck Murray et al., dated February 2020, the entire contents of which are incorporated by reference as if fully set forth herein. Notwithstanding the example system of FIG. 1, techniques described herein may be performed by any computing system that stores and/or has access to spherical polygon ("geographical") data.

Spherical Polygons

Figure 2:
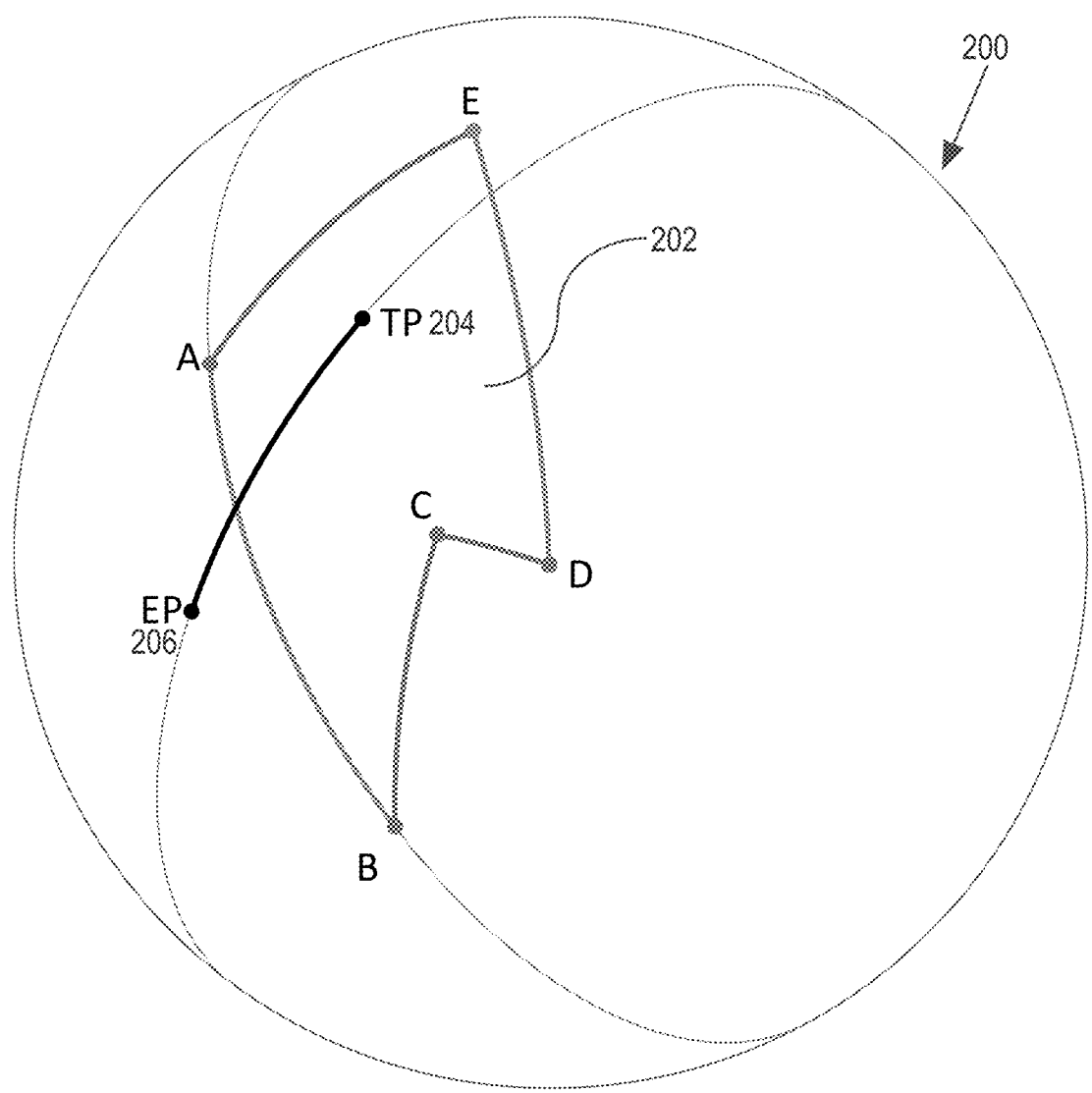
FIG. 2 depicts a sphere with a spherical polygon that lies on the surface of the sphere, and also a test arc connecting the test point and a point that is known to be external to the polygon.

FIG. 2 depicts an earth 200 with an example spherical polygon 202 that is assumed to lie on the surface of earth 200. According to an embodiment, to simplify calculations, earth 200 is assumed to be a perfect sphere with an example radius of '1'.

FIG. 2 also depicts a test point (TP) 204 and an external point (EP) 206 that is known to be external to polygon 202. Database data 122, maintained by instance 114, stores information identifying the vertices that define spherical polygon 202 with respect to earth 200. For example, polygon vertices are defined using three vectors, each one representing a different coordinate value (for the X, Y, and Z planes) with respect to the earth's origin (O). Herein, the terms "center" and "origin" are used interchangeably to mean to very center point of a sphere or circle. Herein, the term "vector" refers to data vectors defined by three-dimensional points. Similarly, test points and external points are defined using three vectors with respect to the earth's origin.

Accordingly, descriptions herein of performing calculations on points or vertices may include performing the calculations on the vectors that define the points or vertices. For example, performing a cross-product on points A and B with an origin (O) involves performing the cross product on the vector A-O and the vector B-O.

A spherical polygon is defined by edges that are arcs of intersecting "great circles" (or "great circle arcs") of a given sphere, such as earth 200. Any two points on a sphere define at least one great circle, which is a circle, on the sphere, whose radius is the radius of the sphere and whose center is also the center of the sphere. Further, any two points on a sphere that are not directly across from each other (i.e., where the points are not antipodal) define a single great circle. A "great circle arc" (or "arc" on a sphere) is a section of a great circle that connects two points on the sphere. Herein, an "arc" generally refers to the smaller section of the great circle that joins two points on the great circle.

Pre-Computation Phase: Polygon Characterization

According to an embodiment, spatial engine 116 determines to solve the spherical PIP problem depicted in FIG. 2, i.e., whether TP 204 is within spherical polygon 202. For example, spatial engine 116 receives a request, from a client (not depicted in FIG. 1), to determine whether TP 204 is within polygon 202.

Figure 3:
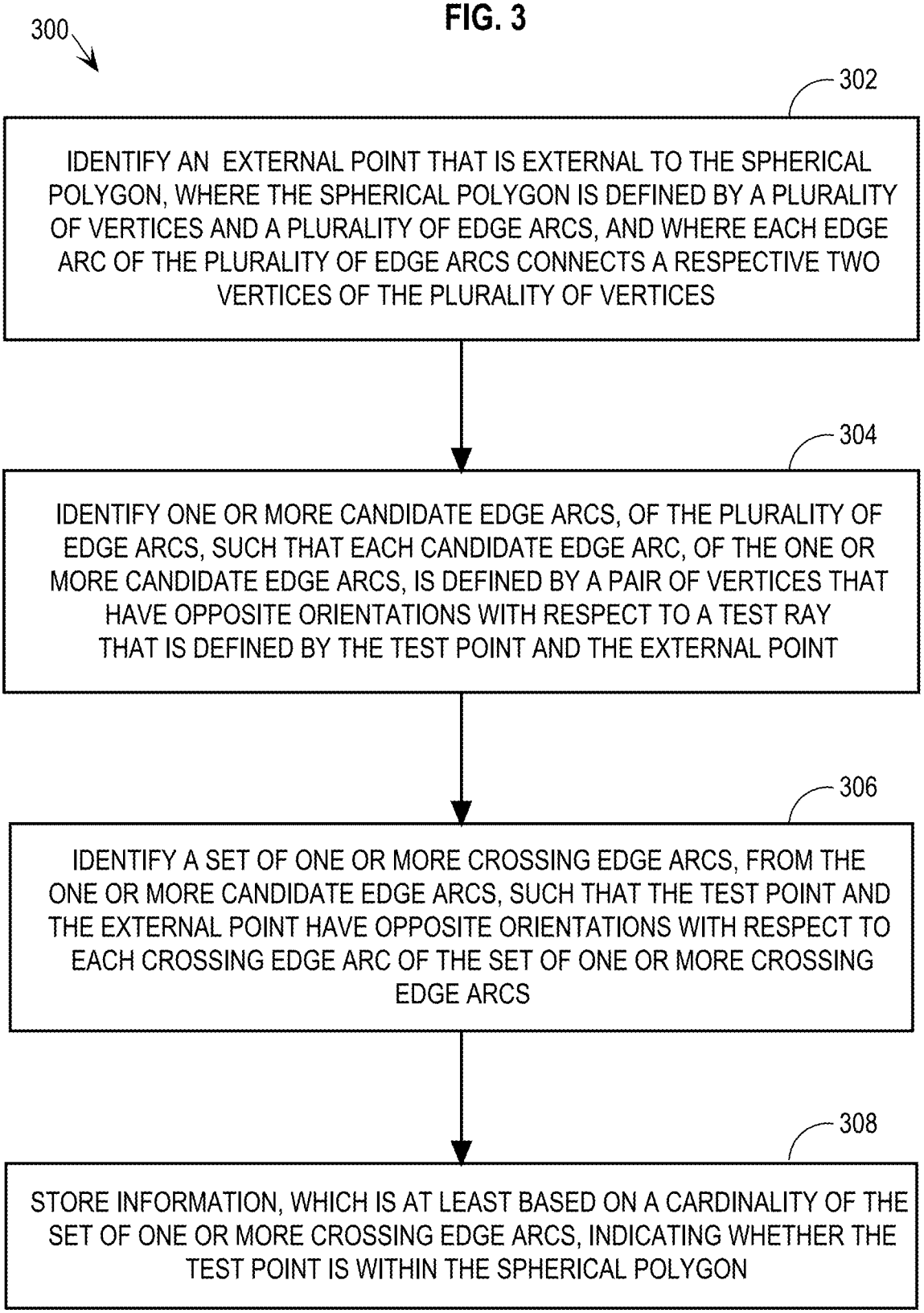
FIG. 3 depicts a flowchart for determining whether a test point is within the bounds of a spherical polygon, according to an embodiment

FIG. 3 depicts a flowchart 300 for determining whether a test point is within the bounds of a spherical polygon, according to an embodiment. Specifically, at step 302, an external point that is external to the spherical polygon is identified, where the spherical polygon is defined by a plurality of vertices and a plurality of edge arcs, and where each edge arc of the plurality of edge arcs connects a respective two vertices of the plurality of vertices.

According to an embodiment, in a pre-computation phase initiated in response to a first request for a PIP solution involving polygon 202, spatial engine 116 pre-computes preliminary information related to polygon 202. This pre-computed information is reused for every test point that relates to this polygon. As shown herein, such pre-computations are not as expensive as precomputations that would be required for an R-Tree data structure.

For example, according to an embodiment, in response to receiving a request from a client to perform spherical PIP analysis to determine whether TP 204 is within the bounds of polygon 202, spatial engine 116 determines whether a pre-computation phase has already been performed for polygon 202 as part of a previous request for a PIP solution involving polygon 202, during which a point that is external to polygon 202 was identified. If a pre-computation phase has already been performed, then spatial engine 116 identifies a test ray for the current PIP problem based on the external point (e.g., EP 206) that was identified during this previous pre-computation phase. If a pre-computation phase has not already been performed for polygon 202, then spatial engine 116 initiates the pre-computation phase for polygon 202.

Figure 4:
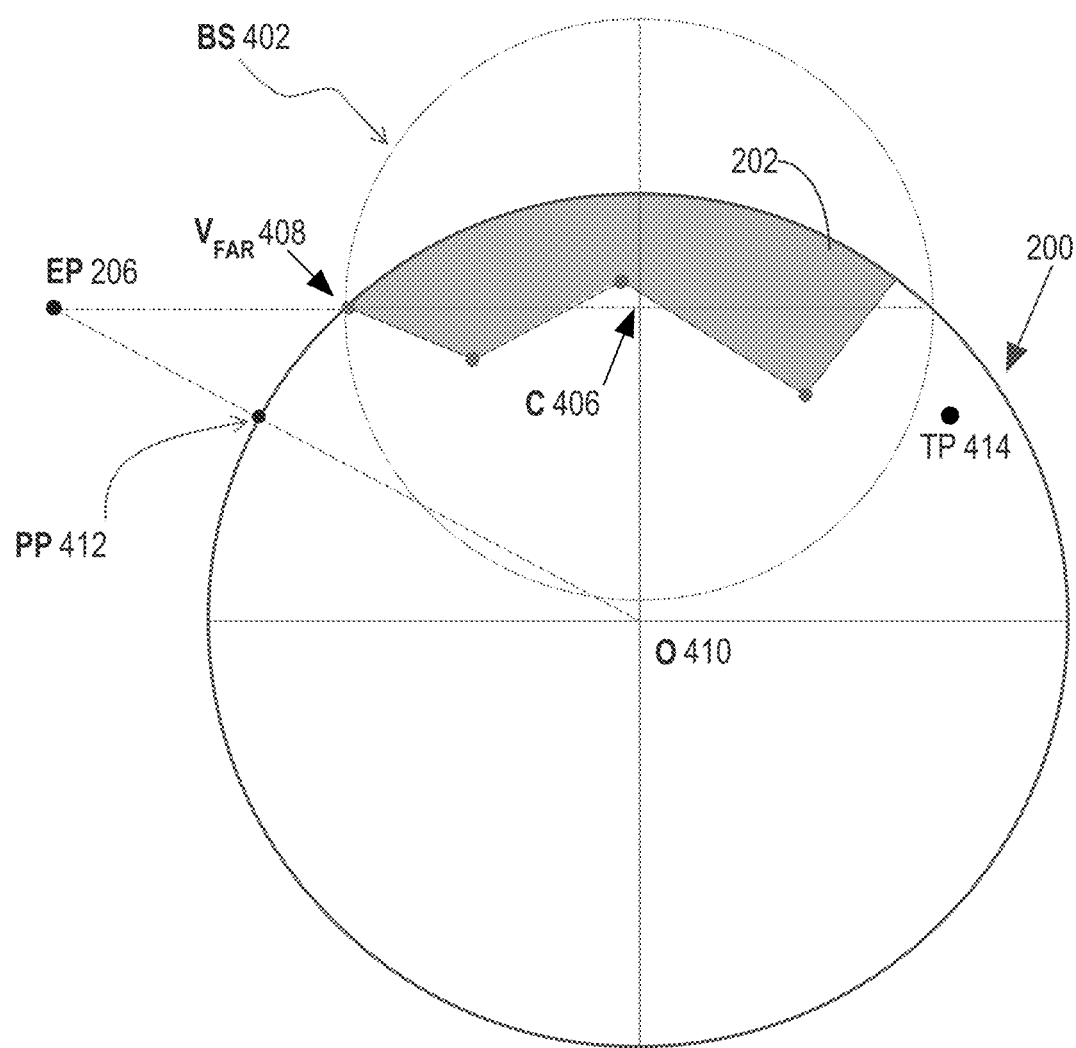
FIG. 4 depicts a bounding sphere that encloses all of the vertices of a spherical polygon on the surface of the sphere, as well as a test point and an external point known to be external to the spherical polygon.

According to an embodiment, during the pre-computation phase, spatial engine 116 calculates a bounding sphere (BS) 402 depicted in FIG. 4, where BS 402 encompasses all of the vertices of polygon 202. It is noted that FIG. 4 depicts earth 200 with polygon 202 such that only a portion of the polygon is shown, and the other portion of the polygon represented as beyond the perspective horizon of earth 200. According to an embodiment, the bounding sphere 402 is characterized by two points: its center, C 406, and a point, $V_{far}$ 408, which is the farthest vertex of polygon 202 from C 406.

Computing a minimum bounding sphere for a spherical polygon is an expensive operation. As such, according to an embodiment, spatial engine 116 calculates BS 402 using an approximate algorithm that returns a bounding sphere that is bigger than, or equal to, the minimum bounding sphere for polygon 202. Specifically, spatial engine 116 determines a minimum bounding box (MBB) for all vertices of polygon 202 based on the maximum and minimum values of polygon 202 in all three dimensions. Spatial engine 116 approximates a close-to-minimum bounding sphere for polygon 202, i.e., BS 402, by taking the center of the MBB to be the center (C) 406 of BS 402. Further, spatial engine 116 calculates the squared distance of each vertex of polygon 202 from the center of the MBB. Spatial engine 116 uses the distance to the vertex ($V_{far}$) 408 of polygon 202 that is farthest from the center of the MBB to be the radius of BS 402. According to an embodiment, the radius of BS 402 is stored as a squared distance to avoid performing the square root operation on the squared distance from the center of the MBB to $V_{far}$ 408.

As part of the pre-computation phase, spatial engine 116 uses BS 402 to compute EP 206. EP 206 need not be on the surface of the earth to be used to define the test ray. A test ray may be a vector or an arc defined by the following two points: (a) the test point, and (b) a point that is known to be external to the spherical polygon. A test ray that is a vector with an external point that is not on the surface of the earth, such as a vector defined by a test point on the surface of earth 200 and EP 206, may be projected to the surface of earth 200 to define a corresponding arc.

Specifically, EP 206 may be projected to the surface of earth 200 (having an origin (O) 410) at projection point (PP) 412 based on the vector PP(412)-O(410) both (a) having the same direction as the vector EP(206)-O(410), and (b) having a magnitude that is equal to the radius of earth 200. The arc defined by a test point and PP 412 is referred to as the corresponding arc for the vector defined by EP 206 and the same test point. The orientation of any point on the surface of earth 200 with respect to a particular test vector is the same as the orientation for the same point with respect to the test arc that corresponds to the particular test vector. Further, a great circle that is aligned with a test ray is either (a) the great circle on which the test ray lies when the test ray is an arc that lies on the surface of the earth, or (b) is the great circle on which a test arc that corresponds to the test ray lies when the test ray is a vector.

Computation of EP 206 is simpler when the center of BS 402 maintains a 90° angle for $V_{far}$(408)-C(406)-O(410). Specifically, by keeping this 90° angle, it is ensured that PP 412 is not too close to the polygon border, and also is not so far from the border as to be in the opposite hemisphere of the earth from the polygon. Thus, according to an embodiment, if the angle $V_{far}$(408)-C(406)-O(410) is not initially at a 90°, then spatial engine 116 automatically positions BS 402 such that C 406 maintains a 90° angle with respect to O 410 and $V_{far}$ 408.

The intersection between the bounding sphere and the earth is a circle that contains the whole polygon inside, except for the $V_{far}$ vertex that is on the circle. The distance from any point in the line O-C to any point on the border circle is always the same. Thus, choosing another bounding sphere with center C' in the O-C line and radius |C'−Vfar| will result in exactly the same intercepting (bounding) circle. As such, the shifted sphere is not only still a bounding sphere but, for the algorithm purposes, will behave exactly like the original bounding sphere. According to an embodiment, spatial engine 116 causes instance 114 to store the information defining BS 402 in database data 222. Descriptions herein assume that the bounding sphere 402 is the translated sphere (unless otherwise stated), when such translation is performed as described above.

Spatial engine 116 uses BS 402 to identify EP 206. According to an embodiment, spatial engine 116 computes EP 206 to be the point at the extreme of a vector that has the same direction as the vector C(406)-$V_{far}$(408) with twice the magnitude of C(406)-$V_{far}$(408), as shown by the vector C(406)-EP(206) depicted in FIG. 4. According to an embodiment, another multiplier is applied to the magnitude of vector C(406)-$V_{far}$(408) to identify EP 206, such that PP 412 is external to polygon 202 and, additionally, PP 412 is in the same hemisphere as the bounding sphere (and of course the polygon). According to an embodiment, one or more distance values are calculated and maintained as squared values to avoid performing the square root operation on the values.

Pre-Computation Phase: Large Polygons

Figure 5:
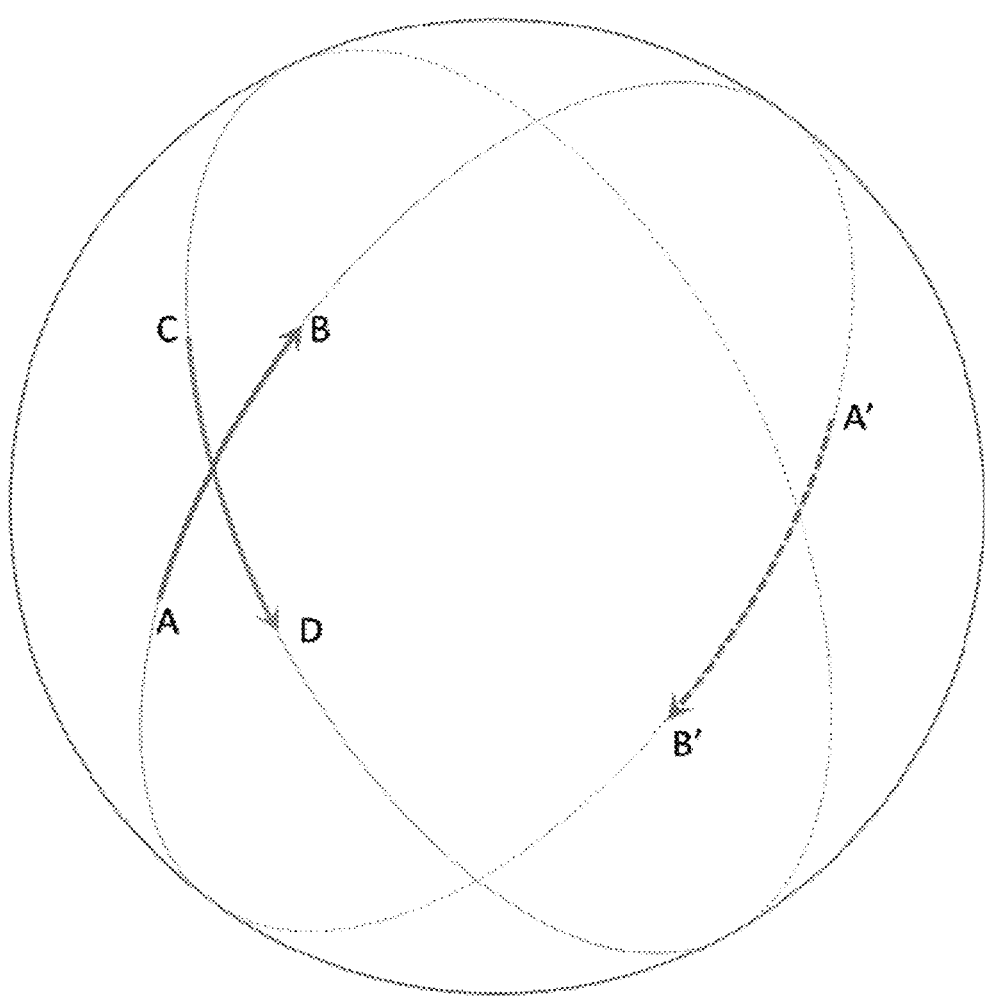
FIG. 5 depicts an arc A-B that crosses an arc C-D, and also another arc A'-B' that is on the same great circle as arc A-B and that is located on the other side of the sphere from arc C-D.

According to an embodiment, PIP analysis is ceased upon determining that the spherical polygon does not fit within a hemisphere of earth 200 (i.e., the polygon is a "large" polygon). Specifically, the bounding sphere technique used to identify an external point, as described above, is not guaranteed to identify a point that is, indeed, external to a large spherical polygon. Furthermore, if an external point is identified for a large polygon, a test ray (defined by the test point and the external point) may reside on the opposite side of the earth from an edge of the polygon, which can cause a false positive crossing result. To illustrate, FIG. 5 depicts an arc A-B that crosses an arc C-D, and also another arc A'-B' that is on the same great circle as arc A-B and that is located on the other side of the earth from arc C-D. According to techniques described below, arc A'-B' may erroneously be classified as crossing arc C-D because the vertices that define arc A'-B' have opposite orientations with respect to arc C-D.

Thus, according to an embodiment, the pre-computation phase for a given spherical polygon involves determining whether the spherical polygon fits within a single hemisphere of the earth prior to initiating any test phases described below. For example, during the pre-computation phase, spatial engine 116 ceases PIP analysis for a given polygon if the polygon satisfies one or more of the following example over-size criteria: (1) the center of an MBB calculated for the polygon is within a threshold distance from the origin of the earth; (2) the center of a bounding sphere calculated for the polygon is within a threshold distance from the origin of the earth; or (3) the center of the bounding sphere is located in an opposite orientation from the center of the MBB.

According to an embodiment, the above conditions are calculated using the MBB prior to identifying BS 402 such that, if processing is aborted, then it was not necessary to calculate BS 402. For example, to determine whether the center of BS 402 is located in an opposite direction from the center of the MBB, the dot-product between $V_{far}$ 408 and the center of the MBB is computed. If this dot-product is negative, then the center of BS 402 would be on the opposite side of earth 200, and processing is aborted. Similarly, if the dot-product between $V_{far}$ 408 and the center of the MBB is under a threshold size, then the computed center of BS 402 would be too close the earth center (condition 2 above), and processing is aborted. Accordingly, in this embodiment, conditions 2 and 3 are checked with a single expression: Dot Product<Threshold.

First Test Phase: Test Ray Classifier Vector

After identifying EP 206 as the external point for polygon 202, spatial engine 116 initiates the first of four test phases for the PIP problem, where the test phases are specific to a given test point. During a first test phase, TP 204 and a test ray defined by TP 204 and EP 206 (referred to herein as "TP-EP") are analyzed in preparation for further test phases.

According to an embodiment, during the first test phase, spatial engine 116 determines whether TP 204 is inside BS 402 using squared distances from C 406. Using squared distance values allows comparison of distance values without requiring costly square root operations. If a test point is not within the bounds of BS 402, spatial engine 116 immediately classifies the test point as external to spherical polygon 202 without requiring further analysis of the test point. For example, spatial engine 116 determines to solve a spherical PIP problem, with respect to polygon 202, for a test point 414 of FIG. 4. In this example, the squared radius of BS 402 is 0.5625, and spatial engine 116 determines that the squared distance of TP 414 from C 406 is 0.81. Because the squared distance of TP 414 from C 406 is larger than the squared radius of BS 402, application automatically classifies TP 414 as external to polygon 202 and ceases PIP analysis for TP 414.

When the test point is within the bounds of BS 402, such as with TP 204, EP 206 is used to determine whether the test point is within spherical polygon 202. Specifically, according to an embodiment, spatial engine 116 identifies the test ray, TP-EP, to be the vector TP(204)-EP(206). In preparation for further test phases, during this first test phase, spatial engine 116 calculates the cross-product of TP-EP. As referred to herein, the cross-product of an arc or vector, such as the test ray, is the cross-product of the vectors defined by O 410 and the vertices/points defining the arc or ray. For example, in the case of TP-EP, TP 204 and EP 206 are the points that define the test ray. Thus, the cross-product for TP-EP is calculated based on the vectors O(410)-TP(204) and O(410)-EP(206).

Figure 6:
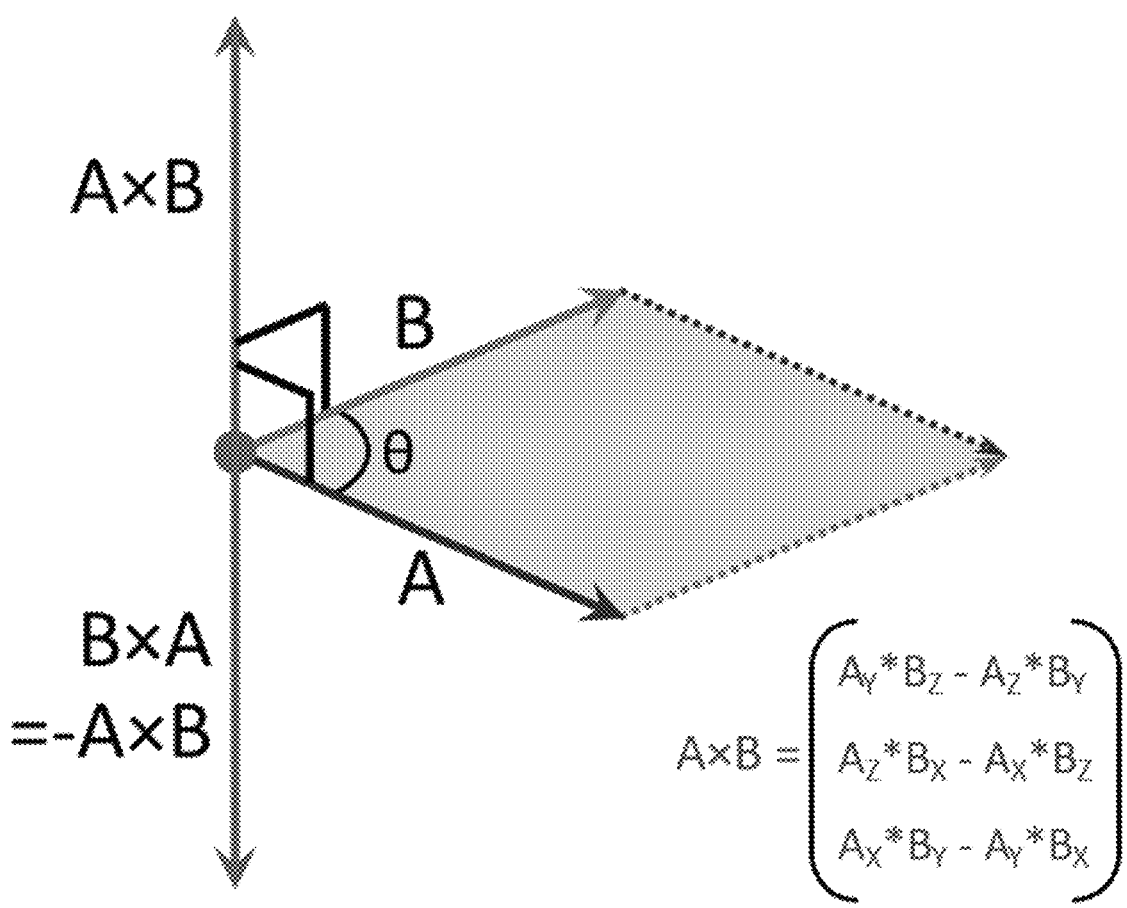
FIG. 6 depicts the cross-product of vectors A and B.
Figure 7:
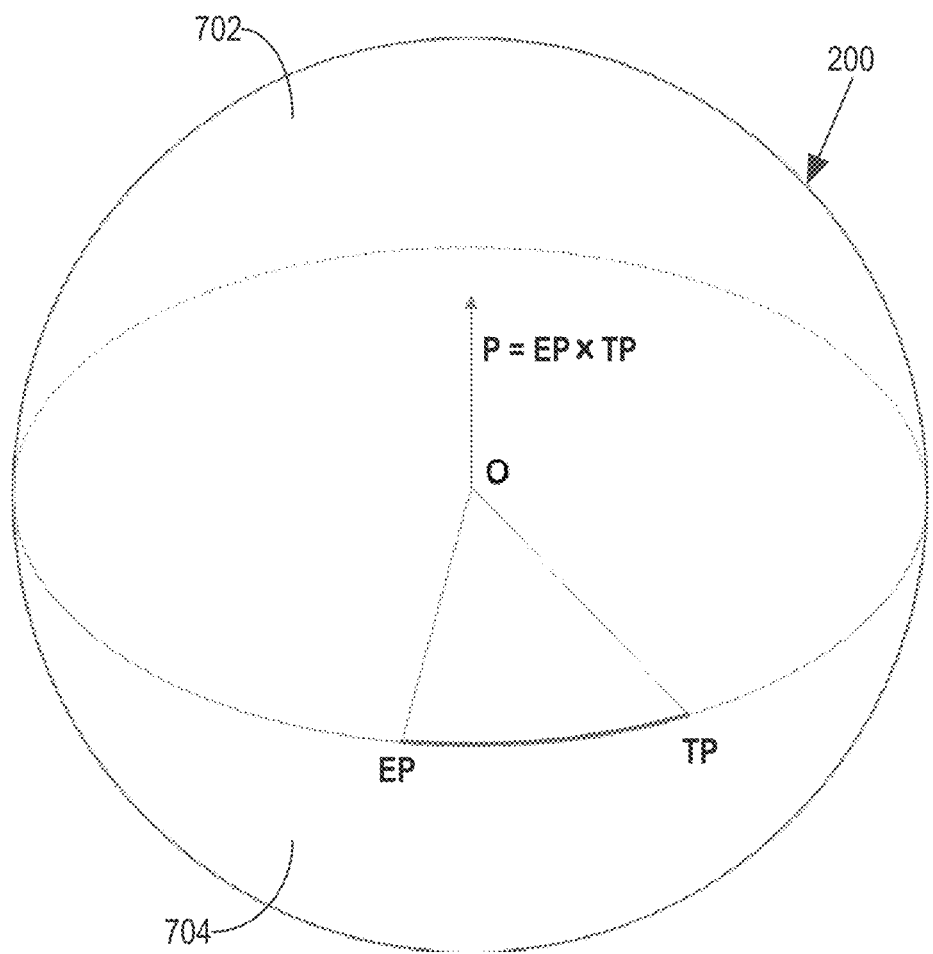
FIG. 7 depicts the cross product, P, of an example test ray TP-EP.

FIG. 6 depicts the cross-product of points A and B, e.g., of an example arc A-B on earth 200. The vector A×B, which is the result of the cross-product, is referred to herein as the "classifier vector" of arc A-B. FIG. 7 depicts the classifier vector, P, of an example test ray TP-EP. As shown in FIG. 7, P is a vector that is orthogonal to the plane formed by the vectors EP-0 and TP-0. The magnitude of P is equal to the shared area (i.e., the area of the parallelogram depicted in FIG. 6, with A and B as sides) and is a measure of the difference between EP and TP. Furthermore, in this case, the difference between vectors refers to vector directions. More specifically, if the vectors are orthogonal, then the difference is maximal and so is the shared area (cross-product). If the vectors point in the same direction (or very similar directions) the difference is minimal, and the cross product is zero (or close to zero). The cost of a cross-product operation is generally six multiplication operations and three subtraction operations, and memory is required to store three result elements.

As described in further detail herein, the classifier vector of an arc/ray is used to identify the orientation of any point on the surface of earth 200 with respect to the arc/vector. For simplicity, the hemispheres of earth 200 defined by the great circle on which the arc lies are referred to herein as "right" and "left", respectively. Thus, a point on earth 200 within the "right" hemisphere defined by the great circle of a given arc has a right-orientation with respect to the arc, and a point on earth 200 within the "left" hemisphere defined by the great circle has a left-orientation with respect to the arc. According to an embodiment, the order of vertices that define an arc indicates a direction of the arc, e.g., arc A-B goes in the opposite direction of arc B-A. To illustrate, in FIG. 2, for arc A-B, TP 204 is to the left of the arc, and EP 206 is to the right of the arc. However, if the arc were defined B-A, then TP 204 would be to the right of the arc, and EP 206 would be to the left. Furthermore, the classifier vector for an arc facilitates determining the distances of points on the surface of the earth from the arc.

According to an embodiment, classifier vectors are scaled to the length of the earth's radius. This scaling of a classifier vector is useful when deciding whether a given point is on a polygon border (given a tolerance value), as described in further detail below. In applications where points are classified as inside or outside (no matter how close to the border the point is located) the scaling step may be omitted.

Second Test Phase: Right/Left Polygon Points Classification

Based on the classifier vector for TP-EP, a second test phase is performed during which each point of the spherical polygon is classified as either right-oriented (also referred to as "to the right" of the arc/vector) or left-oriented (also referred to as "to the left" of the arc/vector) with respect to TP-EP. For example, spatial engine 116 classifies each vertex, of polygon 202, as right-oriented or left-oriented with respect to TP-EP.

Figure 8:
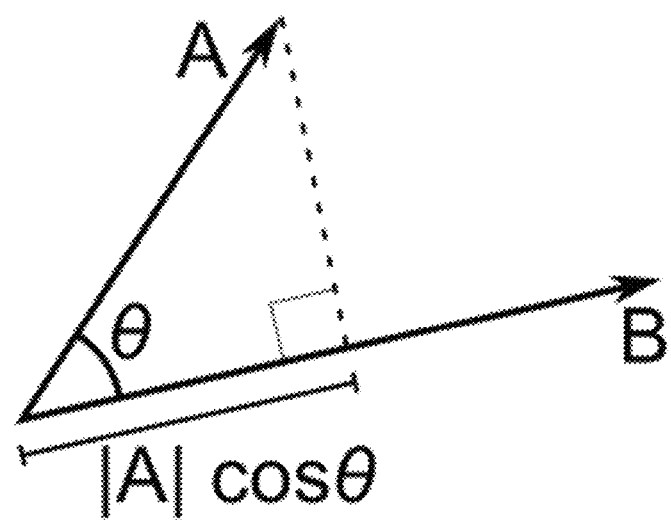
FIG. 8 depicts the dot product between vectors A and B.

To classify a particular vertex of polygon 202, spatial engine 116 calculates a dot product between the vertex and the classifier vector of TP-EP. FIG. 8 depicts the dot product, A∘B, between a vector A (e.g., the vector defined by the vertex being evaluated and the origin of the earth) and a vector B (e.g., the classifier vector). The result of a dot product is scalar, and measures vector similarity. In effect, a dot product is equivalent to projecting one vector (A) on the other vector (B), taking the signed distance of the resulting projection multiplied by the length of B. If the angle between vector A and vector B is less than 90°, the result of the dot product is positive; if the angle is 90°, then the dot product is 0; and if the angle is greater than 90°, the dot product is negative. Computation of a dot product has a relatively low cost, requiring three multiplication operations and two addition operations.

From the dot product expression |A|*|B|*cos(angle), if |B|=1 then the expression is reduced to |A|*cos(angle). That is, when the length of vector B=1, the dot-product of A and B represents the length (with sign) of vector A projected on vector B. As the classifier vectors are orthogonal to the plane formed by its source edge (or test ray), which is the source of the classifier vector, then the dot-product of a point (A) with a classifier vector (of length 1) will be modularly equal to the distance from the point to the source edge (with a negative sign if A is to the right of the edge).

The dot product between a given polygon point (Pn) and the classifier vector for TP-EP is referred to herein as DotPn, where 'n' is an identifier of a polygon vertex. A polygon point, Pn, is considered to be on the right side of TP-EP if DotPn<0, and otherwise, the point is considered to be on the left side of TP-EP. Under this definition, every polygon point is classified as left-oriented or right-oriented, no matter the nearness of the point to TP-EP. For example, referring to the PIP problem depicted in FIG. 2, DotPA is positive, and as such, vertex A is on the left side of TP-EP. DotPB is negative, so vertex B is on the right side of TP-EP.

Simulation of Simplicity

According to an embodiment, every point of a spherical polygon is classified once, even though every point is part of two adjacent edges. This allows use of the "Simulation of Simplicity" technique. (The following document describes this technique, and is incorporated by reference hereby as if fully set forth herein: "Simulation of simplicity: a technique to cope with degenerate cases in geometric algorithms" by Herbert Edelsbrunner, Ernst Mücke, ACM Transactions on Graphics, 9(1):66-104, 1990.)

Simulation of simplicity allows techniques described herein to deal with special cases in solving a given PIP problem (such as the test ray crossing on a polygon vertex) as any normal case, which removes the need to check for some degenerated cases. Thus, according to an embodiment, following the simulation of simplicity, a point is always considered to be (consistently) in one or the other side of test ray, and never on the test ray. Specifically, as indicated above, a polygon point, Pn, is considered to be on the right side of TP-EP if DotPn<0, and otherwise, the point is considered to be on the left side of TP-EP. Under this definition, every polygon point is classified as left-oriented or right-oriented, no matter how near to TP-EP the point lies.

Second Test Phase: Near/Far Polygon Points Classification

According to an embodiment, during the second test phase, every polygon point is also classified as being either "near" to TP-EP, or "far" from TP-EP. A point, Pn, is considered to be "near" TP-EP if |DotPn| is below a pre-defined threshold, and otherwise the point is considered to be "far". This near/far classification of polygon points is utilized to detect and manage coplanarity, as described in further detail below.

According to an embodiment, during this second test phase, the squared distance from every polygon point to TP 204 is also computed. If this squared distance is less than a pre-defined threshold distance, then TP 204 is classified as being on a polygon vertex, or a "point on vertex".

Third Test Phase: Identifying Candidate Edge Arcs

After the second test phase, a third test phase is performed during which each edge arc, of the spherical polygon, is evaluated using the left/right classifications of the polygon points to determine if the edge arc is a candidate edge arc. Returning to the discussion of flowchart 300, at step 304, one or more candidate edge arcs, of the plurality of edge arcs, are identified such that each candidate edge arc, of the one or more candidate edge arcs, is defined by a pair of vertices that have opposite orientations with respect to a test ray that is defined by the test point and the external point. For example, during the third test phase, spatial engine 116 evaluates each polygon edge arc, of polygon 202, to determine whether the edge arc is a candidate for crossing TP-EP.

Specifically, a candidate crossing edge arc is an edge arc whose vertices are on opposite sides of TP-EP, which indicates that there is a possibility that the candidate edge arc crosses the test ray. Identification of candidate edge arcs is inexpensive, and results in weeding out non-candidate edge arcs from further consideration during a fourth test phase, which requires additional cross-product calculation. Thus, the fourth test phase evaluation is only performed on those edge arcs that could potentially cross the test ray. Typically, the third test phase discards most of the polygon edges, and the cross detection operations in the fourth test phase are executed for the relatively few candidate edge arcs.

To illustrate, in FIG. 2, vertices A and B are on opposite sides of TP-EP, and, as such, the edge arc A-B is a candidate edge arc. Further, edge arcs B-C, C-D, and E-A are not candidate edge arcs because the vertices of each of these edge arcs are on the same side of TP-EP. However, vertices D and E are on opposite sides of TP-EP, and, as such, the edge arc D-E is also a candidate edge arc. Thus, edge arcs B-C, C-D, and E-D are discarded in this third test phase, and edge arcs A-B and E-D candidate edge arcs that are passed to the fourth test phase.

According to an embodiment, bitmasks are used to efficiently determine which edge arcs of a polygon are candidate edge arcs. For example, spatial engine 116 generates an orientation bitmask with the determined orientations of the vertices of polygon 202: 01110. In this example, the bits of the orientation bitmask represent vertices A, B, C, D, and E (in that order). An unset (or '0') bit represents a left-orientation of the corresponding vertex, and a set (or '1') bit represents a right-orientation of the corresponding vertex.

To identify the set of candidate edge arcs, spatial engine 116 compares (using XOR) the orientation bitmask with a shifted orientation bitmask that is populated with the same bits as the orientation bitmask shifted by one bit. The bit that is shifted out of the shifted orientation bitmask is placed into the other end of the shifted orientation bitmask. In this way, when there are a small enough number of vertices defining the polygon to fit in a single bitmask, the orientation of the last vertex of the orientation bitmask is compared with the orientation of the first vertex of the shifted orientation bitmask. To illustrate, spatial engine 116 generates the following shifted orientation bitmask by shifting the bits of the orientation bitmask to the left and populating the rightmost bit of the shifted orientation bitmask with the bit ('0') that was shifted out: 11100. In this way, the orientation of every vertex is compared with the orientation of each of its neighbor vertices. The result of the example XOR operation, 10010, indicates that edges A-B and D-E are candidate edge arcs. These mask operations are not only relatively cheap, but they evaluate several edges at the same time.

Some polygons may be defined with a large number of vertices, such that the number of bits in the bitmask is not sufficient to represent all of the vertices (e.g., a spherical polygon has 100 vertices and the bitmask is able to represent only 8). In this case, the last bit of one bitmask is used to compare with the first bit of the next bitmask.

According to an embodiment, a flag variable is stored with the orientation of the last vertex for a bitmask of the previous iteration. More specifically, according to an embodiment, the following steps are performed to store and utilize the flag variable: (1) Before the loop traversing the vertices, compute the orientation of the last polygon vertex, and store this in a variable (Prev_Orientation). (2) In the loop traversing polygon vertices: (2)(a) Using SIMD, compute the orientations of several polygon points. The result of this is a bitmask (orientation_mask). (2)(b) Compute a bitmask with the orientation of previous point, by inserting Prev_Orientation in the beginning of orientation_mask, e.g., using the following formula: Prev_Orientation_mask=(orientation_mask shifted one bit left) OR Prev_Orientation. (2)(c) Compare (XOR) Prev_Orientation_mask with orientation_mask to get the candidate edges. (2)(d) Process the candidate edges as indicated herein. (2)(e) Update Prev_Orientation, for next iteration, to be equal to the last bit of the orientation_mask, e.g., according to the following formula: Prev_Orientation=orientation_mask shifted right (bits_per_mask−1) bits.

Thus, operations to determine the candidate edge arcs (including operations in second and third test phases) require only one dot product per edge (plus one dot product for initialization) and no additional cross-products, in addition to the bit operations to compare the polygon orientation classification.

Fourth Test Phase: Identifying Crossing Edge Arcs

After the third test phase, a fourth test phase is performed during which edges that actually cross TP-EP are identified from the one or more candidate edge arcs. The cardinality of the set of crossing edge arcs is effectively the solution to the PIP problem given that an odd cardinality indicates that the target point is within the bounds of the spherical polygon, and a zero or even cardinality indicates that the target point is outside the bounds of the spherical polygon.

Returning to the discussion of flowchart 300, at step 306, a set of one or more crossing edge arcs, from the one or more candidate edge arcs, are identified such that the test point and the external point have opposite orientations with respect to each crossing edge arc of the set of one or more crossing edge arcs. For example, spatial engine 116 evaluates the set of candidate edge arcs for polygon 202, i.e., edge arcs A-B and D-E, to determine whether these edge arcs actually cross TP-EP. Specifically, spatial engine 116 determines the orientations of TP 204 and EP 206 with regard to each of the candidate edge arcs. If TP 204 and EP 206 have opposite orientations with respect to a given candidate edge arc, TP-EP actually crosses the edge arc. However, if TP 204 and EP 206 have the same orientation with respect to a given candidate edge arc, TP-EP does not cross the edge arc.

According to an embodiment, in a manner that is similar to the determination of whether the points of polygon 202 are to the right or left of TP-EP, as described above, determining on which side of each candidate edge arc the points EP 206 and TP 204 lie comprises calculating the cross-product of each candidate edge arc. For each candidate edge arc, the dot products between the classifier vector, calculated for the candidate edge arc, and each of points EP 206 and TP 204 are calculated. In the case of the A-B arc of FIG. 2, points TP 204 and EP 206 are on opposite sides of A-B. As such, arcs A-B and TP-EP cross. However, EP 206 and TP 204 are on the same side of the edge arc E-D. As such, this edge arc does not actually cross the test ray. Thus, the set of crossing edge arcs for polygon 202 and TP 204 includes only the A-B arc.

At step 308 of flowchart 300, information, which is at least based on a cardinality of the set of one or more crossing edge arcs, indicating whether the test point is within the spherical polygon is stored. For example, spatial engine 116 determines the number (cardinality) of the set of crossing edge arcs that have been identified for polygon 202 and TP 204. Spatial engine 116 stores that number, e.g., in a memory buffer of computing device 110. By calculating the cardinality of the set of crossing edges, spatial engine 116 effectively determines whether TP 204 is inside or outside the bounds of spherical polygon 202.

According to an embodiment, the number of crossing edge arcs is returned to a requesting client as a result of a request to determine whether TP 204 is within spherical polygon 202. For example, if there are multiple test points (including TP 204) being evaluated, a result vector comprising an array with one element per test point being tested against polygon 202 is stored and returned to the client. According to an embodiment, a negative value in an element corresponding to a given test point indicates that the test point has been classified as on the border of the polygon (i.e., within a threshold distance of a polygon edge arc). If the number is an even number, the point is outside the bounds of the polygon. If the element is an odd number, the point is inside the bounds of the polygon.

According to an embodiment, spatial engine 116 determines a classification (e.g., "inside" or "outside") of a test point based on a cardinality of the determined set of crossing edge arcs and returns a boolean value (e.g., TRUE indicates "inside" and FALSE indicates "outside") to a requesting client as a result of a request solve the PIP problem.

According to an embodiment, the dot product for a test point ("DotTP") with respect to each candidate edge arc is also used to check whether the test point is very near to any of the candidate edge arcs. Specifically, the test point is considered to be near a candidate edge arc if |DotTP|, calculated based on the classifier vector of the candidate edge arc, is below a pre-defined threshold. If the dot product for the test point is below the pre-defined threshold, the test point is classified as being on the edge of polygon 202. In this embodiment, evaluation of the test point ceases, and a result indicating that the test point is on the border of the polygon is stored, e.g., −1. According to an embodiment, in the case of an array of results, the result value in the array element corresponding to a test point that is classified as on the border is negative, which distinguishes such a result from non-negative "inside" and "outside" classification values.

A "point on vertex" is considered to be a special case of "point on border". Depending on the application requirements, it may be necessary to distinguish "point on vertex" cases from the general "point on border" cases. This distinction could be done by setting a bit in the returned value. For example, following constants are defined: PIP3_ONBORDER=0x80 (80 hexadecimal=−128 decimal stored in a signed byte) and PIP3_ONVERTEX=0x40. For "point on vertex" cases, the combination of both constants (PIP3_ONBORDER|PIP3_ONVERTEX) is returned, equal to 0xC0 (−64 in decimal signed byte). This way, if the client is interested in "point on border" general cases, the indicator is whether the result is negative. However, if the application requires knowledge of the particular "point on border" case, the application can test (AND) the result with the PIP3_ONVERTEX mask.

Managing Coplanar Cases

According to an embodiment, prior to determining candidate crossing edges, the near/far polygon point classifications are used to determine whether any of the polygon edge arcs are either (a) coplanar with TP-EP in the case that TP-EP is an arc, or (b) in the case of a vector TP-EP, coplanar with an arc that corresponds to TP-EP. Two great circle arcs are considered to be coplanar if all of the vertices for both of the arcs are on the same great circle, or are within a threshold distance from the same great circle. Thus, a polygon edge arc A-B is coplanar to TP-EP when both vertex A and vertex B are classified as being "near" TP-EP during the second test phase described above.

There are various possible cases of coplanarity. In some cases, coplanar-positive edge arcs (which are edge arcs that have been determined to be coplanar with TP-EP) should not be treated as other edge arcs (e.g., in the third and fourth test phases described above), which could result in false cross detections. FIG. 9 depicts different cases of coplanarity. In each case of coplanarity depicted in FIG. 9, the external point is depicted to the left. This is an appropriate simplification of the matter since it is known that EP is external to the polygon being evaluated.

Once it is determined that an edge arc A-B is coplanar-positive, i.e., based on both vertices A and B being classified as "near" TP-EP, linear distance values of the points to EP (either EP 206 or PP 412) are used to determine the case of coplanarity for arc A-B. Linear distance is less costly to calculate than arc length, and is effective for coplanarity classification. To further reduce computation costs by avoiding costly square root operations, the square distances from A to EP, B to EP, and TP to EP are compared (see inferior part of FIG. 9).

To illustrate, if the square distances from EP to A and from EP to B are both greater than the square distance from EP to TP, then the coplanarity instance is a special case 1. If the square distance from EP to A is within a threshold amount of the square distance from EP to TP, then the coplanarity instance is a special case 2. If the square distance from EP to A is less than the square distance from EP to TP and the square distance from EP to B is greater than the square distance from EP to TP, then the coplanarity instance is a special case 3. Finally, if the square distances from EP to A and from EP to B are both less than the square distance from EP to TP, then the coplanarity instance is a typical case 4.

In special case 1, A-B and TP-EP do not cross (so should not be counted), but this case could result in a false cross detection in the fourth test phase described above. Thus, in case 1, the coplanar-positive edge arc is not included in the set of candidate edge arcs. According to an embodiment, special cases 2 and 3 cause that the TP is immediately classified as a "point on border". According to another embodiment, in special case 2, the TP is classified as a "point on vertex", as described in connection with the second test phase above, and, in special case 3, the TP is classified as a "point on border". Case 4 instances are treated as typical cases, and, according to an embodiment, no special action is performed in connection with this typical case, i.e., processing is performed as described in connection with the third and fourth test phases as if the test ray were not coplanar with the edge arc.

According to an embodiment, bitmasks are used to efficiently determine whether edge arcs of a polygon are coplanar with the test ray. For example, spatial engine 116 builds a near/far bitmask with the results of classifications of whether the vertices of polygon 202 are "near" to or "far" from the test ray, where the bits represent vertices A, B, C, D, and E (in that order). For example, in the near/far bitmask, a set bit represents that the vertex is near the test ray, and an unset bit represents that the vertex is not near the test ray. To identify coplanar-positive edge arcs, spatial engine 116 compares (using AND) the near/far bitmask with a shifted near/far bitmask that is populated with the same bits as the near/far bitmask shifted by one bit. According to an embodiment, when a single bitmask is sufficient to represent all vertices of the polygon, the bit that is shifted out of the shifted near/far bitmask is placed into the other end of the shifted near/far bitmask, as described above for the orientation bitmask.

According to another embodiment, when a single bitmask is not sufficient to represent all vertices of the polygon, multiple bitmasks are used, e.g., in the manner described above in connection with the orientation bitmask(s). In this embodiment, for the first iteration there is not a previous shifted out bit, so the bitmask is initialized with "near/far" information from the last vertex in the polygon. In this way, the near/far classification of the last vertex of the near/far bitmask is compared with the near/far classification of the first vertex of the shifted near/far bitmask (in a manner similar to the orientation bitmask described above). The bitmask resulting from the AND operation indicates which edges are considered coplanar-positive. These mask operations are not only relatively cheap, but they evaluate several edges at the same time.

Parallel Operations

According to one or more embodiments, Single Instruction, Multiple Data (SIMD) operations, such as the instructions of AVX-512 instruction sets, are used to accelerate techniques described herein. SIMD architectures allow computers with multiple processing elements to simultaneously perform the same operation on multiple data points. SIMD architectures may perform mainly "vertical" operations where corresponding elements in separate operands are operated upon in parallel and independently. Unlike vertical SIMD instructions, horizontal SIMD instructions are performed across the elements of a SIMD register. SIMD instructions allow the execution alignment of the same operation on multiple data elements at once.

According to an embodiment, operations of the third test phase are accelerated using SIMD instructions. For example, several dot products are computed in parallel. As a further example, comparing the distances between a test point and multiple polygon vertices are performed in parallel. As yet another example, in the case that multiple test points are being evaluated with respect to a single spherical polygon, determining whether multiple test points are within a bounding sphere for the spherical polygon is performed in parallel. To illustrate, spatial engine 116 receives one or more requests to determine whether multiple test points are within the bounds of polygon 202. Spatial engine 116 uses SIMD instructions to evaluate, in parallel, whether the square distances of the multiple test points from the center of BS 402 exceed the square radius of BS 402.

Figure 12:
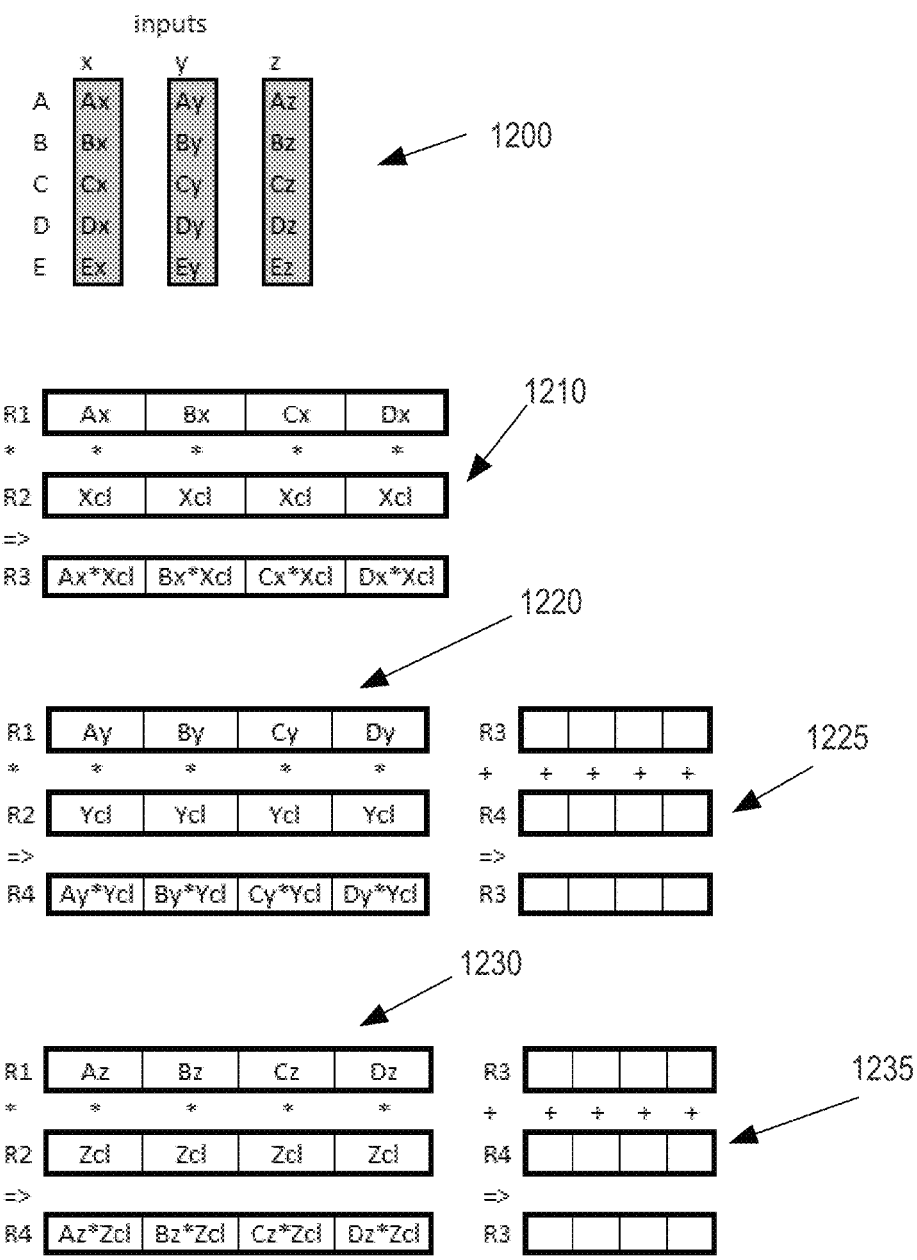
FIG. 12 depicts data stored in volatile memory and vector registers.

The following is an example of multiple dot product computations using SIMD. In this example, data defining the vertices of polygon 202 (FIG. 2) is stored in volatile memory 112 in columnar format such that all X coordinate data for the vertices of polygon 202 is stored together, and also all Y and Z coordinate data is stored together, respectively. FIG. 12 depicts example data in volatile memory 112 and in one or more registers of computing device 110, including X, Y, and Z coordinate data stored in respective memory arrays 1200. More specifically, FIG. 12 depicts a possible in-memory representation for polygon 202 (FIG. 2), and an example of processing several values from this polygon using computer vector instructions. In this example, the classifier vector for TP-EP, with coordinates (Xcl; Ycl; Zcl), is known.

Furthermore, in this example, the platform supports SIMD registers that are able to store four floating point numbers. Thus, to evaluate the vertices with respect to the classifier vector for TP-EP, four values from the X array (X components from points A to D) are loaded in a register (R1), as depicted in registers 1210 of FIG. 12. Subsequently, X coordinate data is broadcast from the classifier vector (Xcl) to all components of another SIMD register (R2), and a vertical multiplication of R1 and R2 is performed, where the result is stored in a register R3, as depicted in registers 1210 of FIG. 12.

After performing the multiplication operation in R3, the same operations are executed on the Y components, storing the result in another register (R4), as depicted in registers 1220 of FIG. 12. R3 is added with the values in R4 to get partial results, as depicted in registers 1225 of FIG. 12. Finally, the same steps are repeated for the Z components as depicted in registers 1230 and 1235 of FIG. 3, and R3 ends with the dot products of the test ray classifier vector with vertices A to D, respectively.

Thus, only three SIMD multiplication operations and two SIMD vertical addition operations are required to compute four dot products, which would have taken 12 multiplication operations in a sequential algorithm. The bigger the SIMD register is, the more dot products can be computed following steps illustrated above. For example, the AVX512 instruction set uses SIMD registers that supports 8 double precision floating point values. As such, using that platform, eight dot products may be computed with three SIMD multiplication operations and two SIMD addition operations.

Furthermore, additional SIMD operations can be performed for points A-D, such as operations required to construct the orientation or near/far bitmasks, while the data for these vertices is loaded in the registers. In a next algorithm iteration, the following set of four points are processed to compute the respective dot-products. In the case of FIG. 2, there is only one remaining point (E), but there could be thousands more vertices for more complex polygons.

According to one or more embodiments, multiple SIMD registers are used to perform parallel operations over data identifying whole 3D points (i.e. its X, Y, and Z coordinates). Utilization of SIMD operations facilitates acceleration of single point operations involved in one or more embodiments, such as the cross-product between two points.

According to an embodiment, parallel performance of operations over 3D points is facilitated by storing point definitions in columnar format. When spatial data is stored in columnar format, every vertex or point property is stored separately from other properties of the polygon, and together with respective properties, of the same type, from other vertices or points. For example, all of the X coordinates from every point of a polygon being analyzed are stored together in a contiguous memory section. This allows application of special Central Processing Unit (CPU)/Graphics Processing Unit (GPU) operations in several (contiguous) elements at the same time. Columnar format is a database concept, and, in a more general scope, it is equivalent to "Structure of Arrays" (SoA) memory arrange, in contrast with "Array of Structures" (AoS) that is not SIMD friendly.

Specifically, according to one or more embodiments, when polygon data is in columnar format, SIMD operations are used to process several points at the same time. According to an embodiment, three SIMD registers (one per coordinate) are used to process the 3D points. In this embodiment, the parallelism that is facilitated by utilizing SIMD operations depends on a width of the SIMD registers being used (this number of elements is referred as "degree of SIMD parallelism"). For example, in AVX512 systems and working with double floating point datatypes, the SIMD register can hold eight different values. In this system, the degree of SIMD parallelism is eight, and eight polygon vertices can be processed in parallel.

According to an embodiment, in the pre-computation phase, minimum and maximum vector operations are used to compute the MBB (and from it the bounding sphere center). When the polygon data is stored in columnar format, these vector operations may be performed in parallel using SIMD operations. Specifically, several mathematical operations are used to compute the square distance from every polygon point to the BS center, which is then used to identify the bigger distance as the Bounding Sphere radius. According to an embodiment, such mathematical operations are computed in parallel, i.e., processing groups of polygon points at the same time where the size of the groups is the degree of SIMD parallelism, using SIMD instructions.

According to an embodiment, polygon points are classified as being "left" or "right" to TP-EP, and/or as being "near"/"far" to TP-EP, in parallel using SIMD instructions. As result of this classification, two bitmask are generated, one for left/right classification and another one for near/far classification. These bitmasks have as many bits as the degree of SIMD parallelism, classifying several points at the same time.

Computations described above may be performed in parallel on a highly parallel architecture such as a graphics processing unit (GPU) or another single instruction, multiple data (SIMD) architecture with or without distributed memories. SIMD architectures allow computers with multiple processing elements to simultaneously perform the same operation on multiple data points.

Distance Between 3D Points

The distance between 3D points is a scalar value, and is calculated as follows: $|A-B|=\sqrt{(A_X-B_X)^2+(A_Y-B_Y)^2+(A_Z-B_Z)^2}$. However, square root calculation is expensive, and, as such, the squared distance is used as indicated above. The cost of computing the squared distance is three multiplication operations and five addition/subtraction operations, which is slightly more expensive than dot product calculation.

Magnitude of a 3D Point Vector

The magnitude of a vertex on a sphere, or the magnitude of the vector defined by the vertex and the center of the sphere, is calculated as follows: $|A|=\sqrt{A_X^2+A_Y^2+A_X^2}$. According to an embodiment, as with the distance between 3D points given the expense of calculating the square root, the squared magnitude is used. Computing the square magnitude is equivalent to calculating the dot product $A \circ A$. The cost of computing the squared distance is three multiplication operations and two addition operations, which is similar to the cost of a dot product calculation.

Projecting a 3D Point on the Earth Surface

In order to project a 3D point, A, on the surface of the earth, the vector A-O (also referred to herein as the vector A) is scaled to a magnitude of 1 as follows:

$$A' = \frac{A}{|A|} = \frac{A}{\sqrt{A \circ A}}.$$

This operation is expensive, requiring three multiplication operations, three division operations (or one reciprocal operation+three multiplication operations), two addition operations, and one square-root operation. Some CPUs can compute the reciprocal square root faster than the 'sqrt', so projecting can be rewritten as $A'=A*rec\_sqrt(A \circ A)$.

Detecting Intersection Points Between Arcs

Computing the intersection point between arcs is an expensive operation. Current code requires at least 11 cross-product operations (including checks for coplanarity), and may require more in the worst case, and also requires up to 17 dot product operations.

In contrast, determining if the arcs intersect, as described in detail above, requires only two cross-product operations and four dot product operations. When compared to computing the intersection point between arcs, determining whether the arcs cross reduces processing requirements by 2-3 magnitudes (more in the worst case).

General Overview: Database Systems

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

Resources from a computing device can be allocated to running a particular database server's software. Each combination of the software and allocation of resources from a computing device is a server that is referred to herein as a "server instance" or "instance". A database server may comprise multiple database instances, some or all of which are running on separate computers, including separate server blades.

Example Database System Configuration

A database client, not depicted in FIG. 1, connects to database system 100. The client may comprise a database application running on a client node. The client interacts with an instance of database system 100, such as instance 114, by submitting commands that cause the instance to perform operations on data stored in the database. For example, a command may be a request to access or modify data from the database, perform operations on the data, and/or return the data to the client. According to an embodiment, a client running on a machine that is not depicted in FIG. 1 requests, from instance 114, spatial computations on data from database data 222.

Typically, database system 100 may be implemented by a single machine, e.g., device 110, or may be implemented by multiple machines that are communicatively connected. Referring to FIG. 1, database server instance 114, running on device 110, maintains database data 122 in persistent storage 120.

According to an embodiment, device 110 may be referred to as a machine node, and runs database server instance 114. A database server instance (or "instance") is a server that comprises a combination of the software and allocation of resources from a machine node. Specifically, a server, such as a database server, or any other process is a combination of integrated software components and an allocation of computational resources, such as memory, a machine node (i.e., a computing device and/or memory accessible to the computing device), and/or sub-processes on the machine node for executing the integrated software components on a processor, the combination of the software and computational resources being dedicated to performing a particular function on behalf of one or more clients. In the embodiment depicted in FIG. 1, instance 114 implements server-side functions of database system 100.

Database data 122 may reside in volatile and/or non-volatile storage, such as volatile memory 112, persistent storage 120, etc. Each machine node implementing database system 100 may include a virtual disk and/or a set of physical disks. Additionally, or alternatively, database data 122 may be stored, at least in part, in main memory of a database server computing device.

One or more of the functions attributed to any process described herein, may be performed by any other logical entity that may or may not be depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
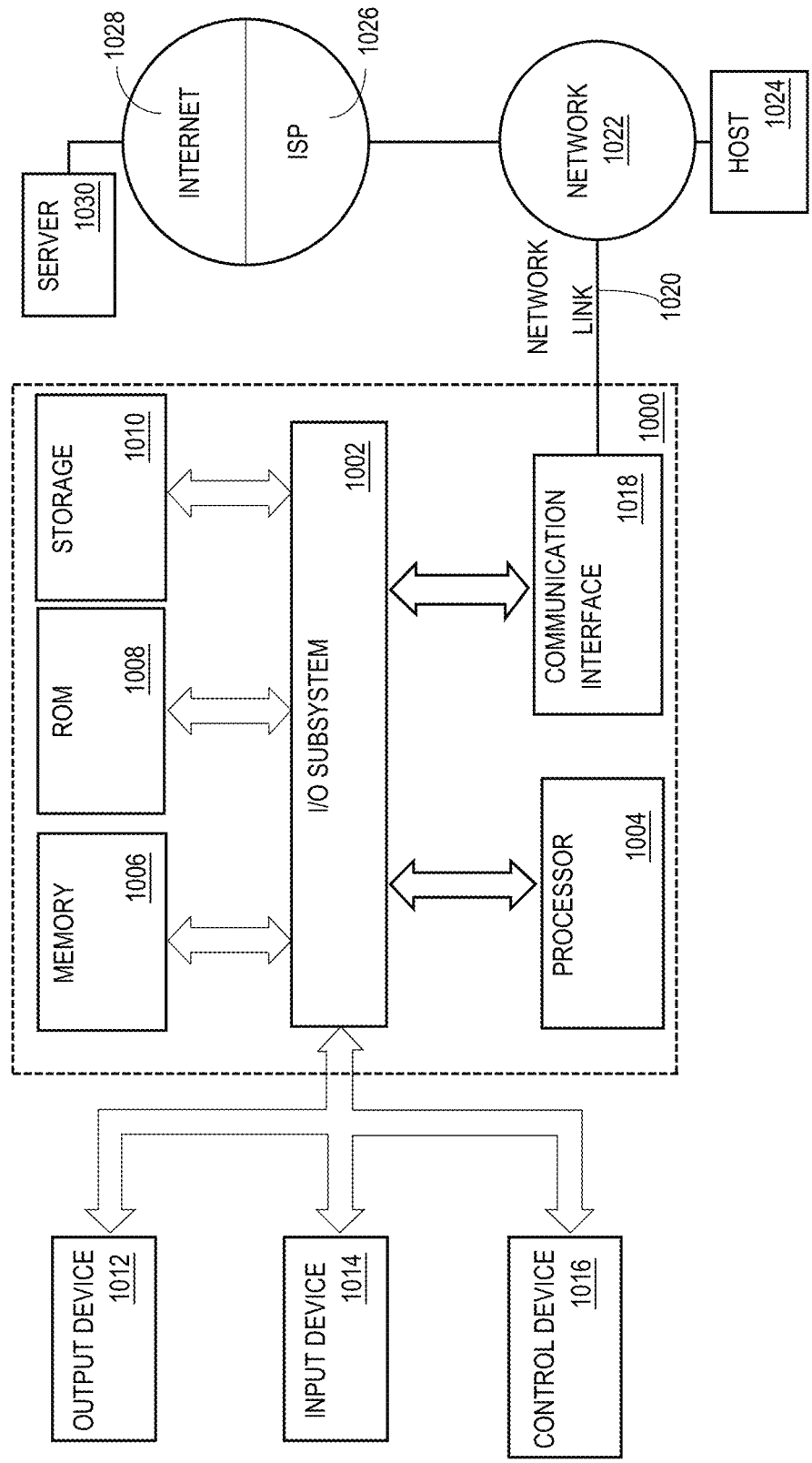
FIG. 10 is a block diagram that illustrates a computer system upon which an embodiment may be implemented.

For example, FIG. 10 is a block diagram that illustrates a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Software Overview

Figure 11:
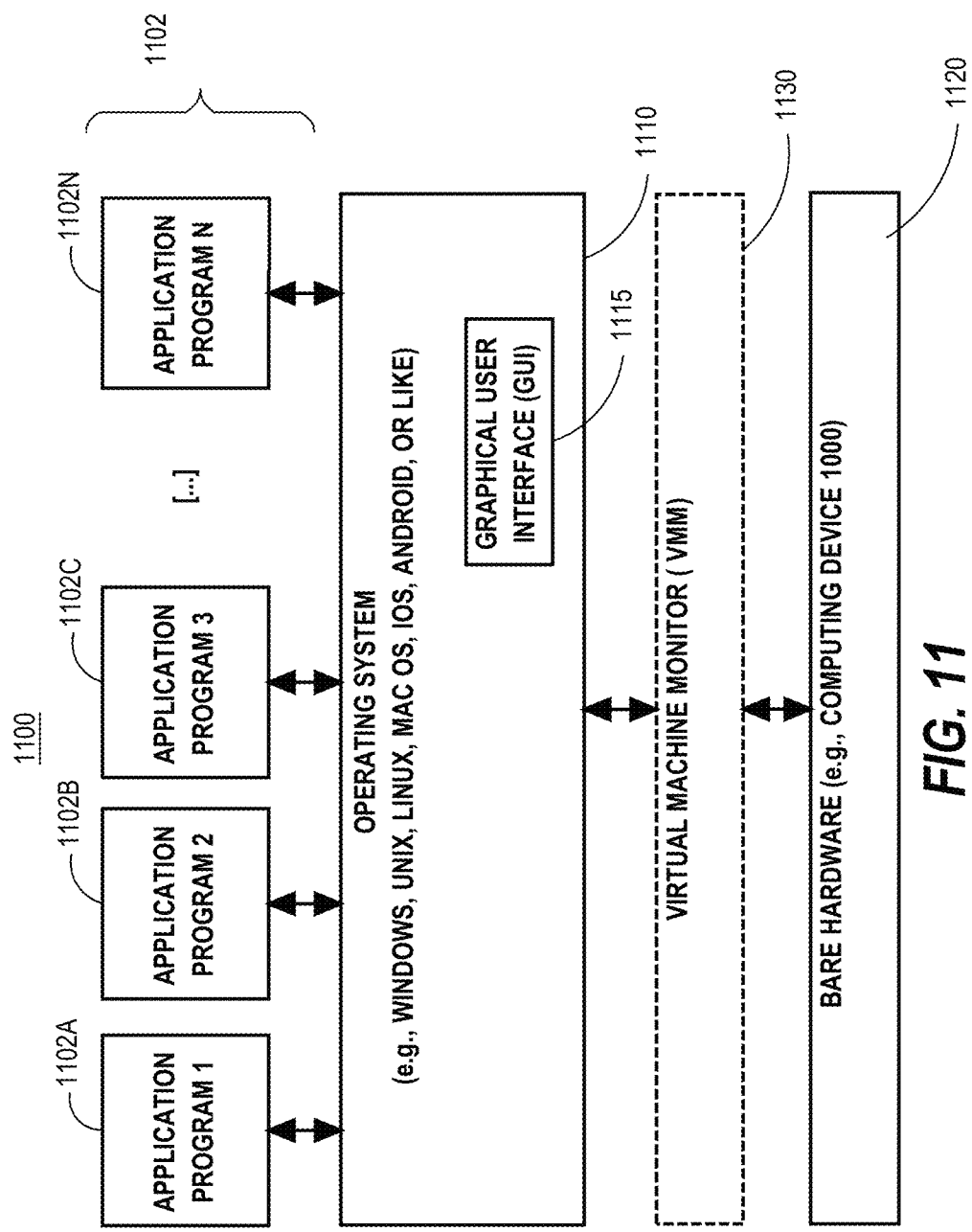
FIG. 11 is a block diagram of a basic software system that may be employed for controlling the operation of a computer system.

FIG. 11 is a block diagram of a basic software system 1100 that may be employed for controlling the operation of computer system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computer system 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1000 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method for determining whether a test point is within a spherical polygon, comprising:
   identifying, by one or more computing devices, an external point that is external to the spherical polygon;
   wherein the spherical polygon is defined by a plurality of vertices and a plurality of edge arcs;
   wherein each edge arc of the plurality of edge arcs connects two vertices of the plurality of vertices;
   identifying, by one or more computing devices, one or more candidate edge arcs, of the plurality of edge arcs, such that each candidate edge arc, of the one or more candidate edge arcs, is defined by a pair of vertices that have opposite orientations with respect to a test ray that is defined by the test point and the external point;
   identifying, by one or more computing devices, a set of one or more crossing edge arcs, from the one or more candidate edge arcs, such that the test point and the external point have opposite orientations with respect to each crossing edge arc of the set of one or more crossing edge arcs; and
   storing, by one or more computing devices, information, which is at least based on a cardinality of the set of one or more crossing edge arcs, indicating whether the test point is within the spherical polygon;
   wherein the method is performed by one or more computing devices.

2. The computer-executed method of claim 1, wherein data defining the plurality of vertices of the spherical polygon is stored in columnar format, the method further comprising:
   using SIMD instructions to perform one or more operations, on the vertices of the spherical polygon, in parallel;
   wherein the one or more operations comprises one or more of:
     performing dot products;
     computing distance values;
     comparing distance values;
     performing cross products;
     identifying minimum and/or maximum values;
     identifying negative values; or
     comparing values to a predetermined threshold value.

3. The computer-executed method of claim 1, wherein:
   a particular candidate edge arc, of the one or more candidate edge arcs, is defined by a first vertex and a second vertex;
   identifying the particular candidate edge arc comprises:
     performing a first dot product, for the first vertex, with respect to a classifier vector that is based on a cross product of the test ray to produce a first scalar result,
     performing a second dot product, for the second vertex, with respect to the classifier vector to produce a second scalar result, and
     determining a first orientation of the first vertex based on the first scalar result and a second orientation of the second vertex based on the second scalar result,
   wherein the first orientation is opposite from the second orientation.

4. The computer-executed method of claim 3, wherein said performing the first dot product and said performing the second dot product are performed in parallel.

5. The computer-executed method of claim 1, further comprising:
   receiving a request to determine whether the test point is within the spherical polygon; and
   providing the information, which is at least based on the cardinality of the set of one or more crossing edge arcs, as a response to the request.

6. The computer-executed method of claim 1, further comprising:
   calculating a bounding sphere that bounds the spherical polygon; and
   wherein said identifying the external point is based, at least in part, on the bounding sphere.

7. The computer-executed method of claim 6, further comprising determining that a second test point is outside the spherical polygon by determining that the second test point is outside the bounding sphere.

8. The computer-executed method of claim 7, wherein determining that the second test point is outside the bounding sphere is performed, in parallel, with determining whether a third test point is outside the bounding sphere.

9. The computer-executed method of claim 1, further comprising:
   prior to said identifying one or more candidate edge arcs, determining whether the spherical polygon satisfies at least one over-size criterion;
   wherein said identifying one or more candidate edge arcs is performed in response to determining that the spherical polygon does not satisfy the at least one over-size criterion; and
   wherein the at least one over-size criterion comprises one or more of:
   (a) a center of a minimum bounding box, for the plurality of vertices, is within a threshold distance to a center of a base sphere on which the spherical polygon resides,
   (b) a center of a bounding sphere that bounds the spherical polygon is within a threshold distance to an origin of the base sphere, or
   (c) the center of the bounding sphere is in an opposite direction, with respect to the origin of the base sphere, than the center of the minimum bounding box.

10. The computer-executed method of claim 1, further comprising, prior to said identifying the one or more candidate edge arcs:
    calculating a cross product based, at least in part, on the external point and the test point to produce a classifier vector;
    for each vertex, of the plurality of vertices, determining an orientation of said each vertex with respect to the test ray by calculating a dot product for said each vertex based, at least in part, on said each vertex and the classifier vector.

11. The computer-executed method of claim 1, further comprising:
    calculating a cross product based, at least in part, on the external point and the test point to produce a classifier vector;
    for each vertex, of the plurality of vertices:
      calculating scalar result of a dot product based, at least in part, on said each vertex and the classifier vector,
      determining whether a magnitude of the scalar result is below a threshold magnitude,
      if the magnitude of the scalar result is below the threshold magnitude, classifying said each vertex as near, and
      if the magnitude of the scalar result is not below the threshold magnitude, classifying said each vertex as not near; and
    identifying one or more coplanar edge arcs, of the plurality of edge arcs, based on both vertices of each coplanar edge arc, of the one or more coplanar edge arcs, being classified as near.

12. The computer-executed method of claim 11, further comprising, for a particular coplanar edge arc of the one or more coplanar edge arcs:
    based, at least in part, on distances between the external point and each of the test point, a first vertex of the particular coplanar edge arc, and a second vertex of the particular coplanar edge arc, identifying one of:
    a special case in which the test ray does not cross the particular coplanar edge arc;
    a special case in which the test point is on a border of the spherical polygon; or
    a typical case in which processing of the test point continues as if the test ray were not coplanar with the particular coplanar edge arc.

13. The computer-executed method of claim 1, further comprising:
    determining whether the cardinality of the set of one or more crossing edge arcs is odd;
    responsive to determining that the cardinality of the set of one or more crossing edge arcs is odd, determining that the test point is within the spherical polygon; and
    responsive to determining that the cardinality of the set of one or more crossing edge arcs is not odd, determining that the test point is not within the spherical polygon.

14. One or more non-transitory computer-readable media storing one or more sequences of instructions that, when executed by one or more processors, cause:
    determining whether a test point is within a spherical polygon comprising:
      identifying, by one or more computing devices, an external point that is external to the spherical polygon;
      wherein the spherical polygon is defined by a plurality of vertices and a plurality of edge arcs;
      wherein each edge arc of the plurality of edge arcs connects two vertices of the plurality of vertices;
      identifying, by one or more computing devices, one or more candidate edge arcs, of the plurality of edge arcs, such that each candidate edge arc, of the one or more candidate edge arcs, is defined by a pair of vertices that have opposite orientations with respect to a test ray that is defined by the test point and the external point;
      identifying, by one or more computing devices, a set of one or more crossing edge arcs, from the one or more candidate edge arcs, such that the test point and the external point have opposite orientations with respect to each crossing edge arc of the set of one or more crossing edge arcs; and
      storing, by one or more computing devices, information, which is at least based on a cardinality of the set of one or more crossing edge arcs, indicating whether the test point is within the spherical polygon.

15. The one or more non-transitory computer-readable media of claim 14, wherein:
    data defining the plurality of vertices of the spherical polygon is stored in columnar format; and
    the one or more sequences of instructions further comprise instructions that, when executed by one or more processors, cause:
      using SIMD instructions to perform one or more operations, on the vertices of the spherical polygon, in parallel;
      wherein the one or more operations comprises one or more of:
        performing dot products;
        computing distance values;
        comparing distance values;
        performing cross products;

identifying minimum and/or maximum values;
identifying negative values; or
comparing values to a predetermined threshold value.

16. The one or more non-transitory computer-readable media of claim 14, wherein:
a particular candidate edge arc, of the one or more candidate edge arcs, is defined by a first vertex and a second vertex;
identifying the particular candidate edge arc comprises:
performing a first dot product, for the first vertex, with respect to a classifier vector that is based on a cross product of the test ray to produce a first scalar result,
performing a second dot product, for the second vertex, with respect to the classifier vector to produce a second scalar result, and
determining a first orientation of the first vertex based on the first scalar result and a second orientation of the second vertex based on the second scalar result, wherein the first orientation is opposite from the second orientation.

17. The one or more non-transitory computer-readable media of claim 16, wherein said performing the first dot product and said performing the second dot product are performed in parallel.

18. The one or more non-transitory computer-readable media of claim 14, wherein the one or more sequences of instructions further comprise instructions that, when executed by one or more processors, cause:
receiving a request to determine whether the test point is within the spherical polygon; and
providing the information, which is at least based on the cardinality of the set of one or more crossing edge arcs, as a response to the request.

19. The one or more non-transitory computer-readable media of claim 14, wherein the one or more sequences of instructions further comprise instructions that, when executed by one or more processors, cause:
calculating a bounding sphere that bounds the spherical polygon; and
wherein said identifying the external point is based, at least in part, on the bounding sphere.

20. The one or more non-transitory computer-readable media of claim 19, wherein the one or more sequences of instructions further comprise instructions that, when executed by one or more processors, cause determining that a second test point is outside the spherical polygon by determining that the second test point is outside the bounding sphere.

21. The one or more non-transitory computer-readable media of claim 20, wherein determining that the second test point is outside the bounding sphere is performed, in parallel, with determining whether a third test point is outside the bounding sphere.

22. The one or more non-transitory computer-readable media of claim 14, wherein the one or more sequences of instructions further comprise instructions that, when executed by one or more processors, cause:
prior to said identifying one or more candidate edge arcs, determining whether the spherical polygon satisfies at least one over-size criterion;
wherein said identifying one or more candidate edge arcs is performed in response to determining that the spherical polygon does not satisfy the at least one over-size criterion; and
wherein the at least one over-size criterion comprises one or more of:
(a) a center of a minimum bounding box, for the plurality of vertices, is within a threshold distance to a center of a base sphere on which the spherical polygon resides,
(b) a center of a bounding sphere that bounds the spherical polygon is within a threshold distance to an origin of the base sphere, or
(c) the center of the bounding sphere is in an opposite direction, with respect to the origin of the base sphere, than the center of the minimum bounding box.

23. The one or more non-transitory computer-readable media of claim 14, wherein the one or more sequences of instructions further comprise instructions that, when executed by one or more processors, cause, prior to said identifying the one or more candidate edge arcs:
calculating a cross product based, at least in part, on the external point and the test point to produce a classifier vector;
for each vertex, of the plurality of vertices, determining an orientation of said each vertex with respect to the test ray by calculating a dot product for said each vertex based, at least in part, on said each vertex and the classifier vector.

24. The one or more non-transitory computer-readable media of claim 14, wherein the one or more sequences of instructions further comprise instructions that, when executed by one or more processors, cause:
calculating a cross product based, at least in part, on the external point and the test point to produce a classifier vector;
for each vertex, of the plurality of vertices:
calculating a scalar result of a dot product based, at least in part, on said each vertex and the classifier vector,
determining whether a magnitude of the scalar result is below a threshold magnitude,
if the magnitude of the scalar result is below the threshold magnitude, classifying said each vertex as near, and
if the magnitude of the scalar result is not below the threshold magnitude, classifying said each vertex as not near; and
identifying one or more coplanar edge arcs, of the plurality of edge arcs, based on both vertices of each coplanar edge arc, of the one or more coplanar edge arcs, being classified as near.

25. The one or more non-transitory computer-readable media of claim 24, wherein the one or more sequences of instructions further comprise instructions that, when executed by one or more processors, cause, for a particular coplanar edge arc of the one or more coplanar edge arcs:
based, at least in part, on distances between the external point and each of the test point, a first vertex of the particular coplanar edge arc, and a second vertex of the particular coplanar edge arc, identifying one of:
a special case in which the test ray does not cross the particular coplanar edge arc;
a special case in which the test point is on a border of the spherical polygon; or
a typical case in which processing of the test point continues as if the test ray were not coplanar with the particular coplanar edge arc.

26. The one or more non-transitory computer-readable media of claim 14, wherein the one or more sequences of instructions further comprise instructions that, when executed by one or more processors, cause:
- determining whether the cardinality of the set of one or more crossing edge arcs is odd;
- responsive to determining that the cardinality of the set of one or more crossing edge arcs is odd, determining that the test point is within the spherical polygon; and
- responsive to determining that the cardinality of the set of one or more crossing edge arcs is not odd, determining that the test point is not within the spherical polygon.

* * * * *

UNITED STATES PATENT AND TRADEMARK OFFICE
CERTIFICATE OF CORRECTION

| | |
|---|---|
| PATENT NO. | : 11,403,367 B2 |
| APPLICATION NO. | : 16/848375 |
| DATED | : August 2, 2022 |
| INVENTOR(S) | : Martinez Cortes et al. |

It is certified that error appears in the above-identified patent and that said Letters Patent is hereby corrected as shown below:

In the Claims

In Column 25, Line 49, in Claim 11, after "calculating" insert -- a --, therefor.

Signed and Sealed this
Third Day of January, 2023

*Katherine Kelly Vidal*

Katherine Kelly Vidal
*Director of the United States Patent and Trademark Office*